(12) United States Patent
Okada et al.

(10) Patent No.: US 12,131,396 B2
(45) Date of Patent: Oct. 29, 2024

(54) SKILL PLATFORM SYSTEM, SKILL MODELING DEVICE, AND SKILL DISSEMINATION METHOD

(71) Applicants: KABUSHIKI KAISHA TOSHIBA, Minato-ku (JP); TOSHIBA DIGITAL SOLUTIONS CORPORATION, Kawasaki (JP)

(72) Inventors: Koji Okada, Chuo (JP); Kazuhiko Nishikawa, Kunitachi (JP); Yoshikatsu Maekawa, Kawasaki (JP); Noboru Fujimaki, Kawasaki (JP); Takashi Iwasaki, Miura (JP); Tadayuki Nakamura, Minato (JP)

(73) Assignees: KABUSHIKI KAISHA TOSHIBA, Tokyo (JP); TOSHIBA DIGITAL SOLUTIONS CORPORATION, Kawasaki (JP)

( * ) Notice: Subject to any disclaimer, the term of this patent is extended or adjusted under 35 U.S.C. 154(b) by 488 days.

(21) Appl. No.: 16/869,638

(22) Filed: May 8, 2020

(65) Prior Publication Data

US 2020/0265535 A1 Aug. 20, 2020

Related U.S. Application Data

(63) Continuation of application No. PCT/JP2018/041383, filed on Nov. 7, 2018.

(30) Foreign Application Priority Data

Nov. 8, 2017 (JP) ................................. 2017-215263

(51) Int. Cl.
*G06Q 50/20* (2012.01)
*G06N 3/04* (2023.01)
(Continued)

(52) U.S. Cl.
CPC ........... *G06Q 50/2057* (2013.01); *G06N 3/04* (2013.01); *G06N 3/08* (2013.01); *G09B 9/00* (2013.01); *G09B 19/00* (2013.01)

(58) Field of Classification Search
CPC .......... G09B 19/00; G09B 9/00; G06Q 50/20; G06N 3/08; G06N 3/04
See application file for complete search history.

(56) References Cited

U.S. PATENT DOCUMENTS 5,943,662 A * 8/1999 Baba ......................... C02F 1/76
706/2
8,224,472 B1 * 7/2012 Maluf .............. G06Q 10/06312
705/7.17
(Continued)

FOREIGN PATENT DOCUMENTS

JP 07-001440 A 1/1995
JP 2003-133200 A 5/2003
(Continued)

OTHER PUBLICATIONS

Kamahara et al., "Multimedia Extension on Skill Succession Support Systems using Eye Movement", IEICE Technical Report, vol. 107, No. 115, Jun. 21, 2007, 16 pages (with English Machine Translation).

(Continued)

*Primary Examiner* — Eddy Saint-Vil
(74) *Attorney, Agent, or Firm* — Maier & Maier, PLLC

(57) ABSTRACT

According to one embodiment, a skill platform system includes a data acquisition unit, a model creation unit and a skill provision unit. The data acquisition unit is configured to acquire data on work of a skilled worker at a first site. The model creation unit is configured to perform modeling a skill of the skilled worker using the data acquired by the data acquisition unit. The skill provision unit is configured to (Continued)

provide the skill of the skilled worker to a second site by using the model created by the model creation unit.

17 Claims, 21 Drawing Sheets

(51) Int. Cl.
*G06N 3/08* (2023.01)
*G09B 9/00* (2006.01)
*G09B 19/00* (2006.01)

(56) References Cited

U.S. PATENT DOCUMENTS

| | | | |
|---|---|---|---|
| 9,256,711 B2* | 2/2016 | Horseman | G16H 40/63 |
| 10,064,552 B1* | 9/2018 | Vaziri | G09B 19/00 |
| 2003/0065663 A1* | 4/2003 | Chu | G06Q 10/10 |
| 2003/0078682 A1 | 4/2003 | Tezuka et al. | |
| 2003/0098798 A1 | 5/2003 | Kato | |
| 2003/0100972 A1* | 5/2003 | Andersh | G06F 8/36 |
| | | | 700/121 |
| 2004/0125120 A1* | 7/2004 | Weiner | G06F 3/011 |
| | | | 715/701 |
| 2007/0219809 A1* | 9/2007 | Peyton | G09B 21/00 |
| | | | 434/308 |
| 2016/0267806 A1* | 9/2016 | Hsu | G09B 19/24 |
| 2018/0129276 A1* | 5/2018 | Nguyen | G09B 9/00 |
| 2018/0174671 A1* | 6/2018 | Cruz Huertas | G16H 10/60 |
| 2018/0354127 A1 | 12/2018 | Ando | |
| 2022/0051578 A1* | 2/2022 | Kolesinski | B64D 45/00 |

FOREIGN PATENT DOCUMENTS

| | | |
|---|---|---|
| JP | 2003-204199 A | 7/2003 |
| JP | 2004-295473 A | 10/2004 |
| JP | 2009-244015 A | 10/2009 |
| JP | 2010-267947 A | 11/2010 |
| WO | WO 2017/159562 A1 | 9/2017 |

OTHER PUBLICATIONS

Kitayama, Technical Description: 3-Cognitive Factory, Achievement of Factory Platform to Inherit Skill of "Craftsman", PROVISION-Professional Vison for Information Technology, Summer 2016, No. 90, Sep. 1, 2016, 11 pages (with English Machine Translation).

Nabeta et al., "Introduction of Conceptual Model into Physical Assessment Skill Training", Information Processing Society of Japan Symposium, Information Education Symposium, Aug. 11, 2011, 24 pages (with English Machine Translation).

Shiose et al., "Knowledge Management for Proficient Skill-Transfer", Documents of $66^{th}$ Knowledge Base System Research Meeting (SIG-KBS-A402), Oct. 28, 2004, 21 pages (with English Machine Translation).

Feng Duan, et al., "Application of the Assembly Skill Transfer System in an Actual Cellular Manufacturing System" IEEE Transactions on Automation Science and Engineering, vol. 9, No. 1, 2012, pp. 31-41.

Haroon Idrees, et al., "The THUMOS Challenge on Action Recognition for Videos "In the wild"" Computer Vision and Image Understanding, vol. 155, 2017, pp. 1-23.

Kang, "Manage Modeling and Simulation", Halbine Engineering University Press, Oct. 2015, 19 pages.

* cited by examiner (A) Thermographic image (B) Image of fire in incinerator

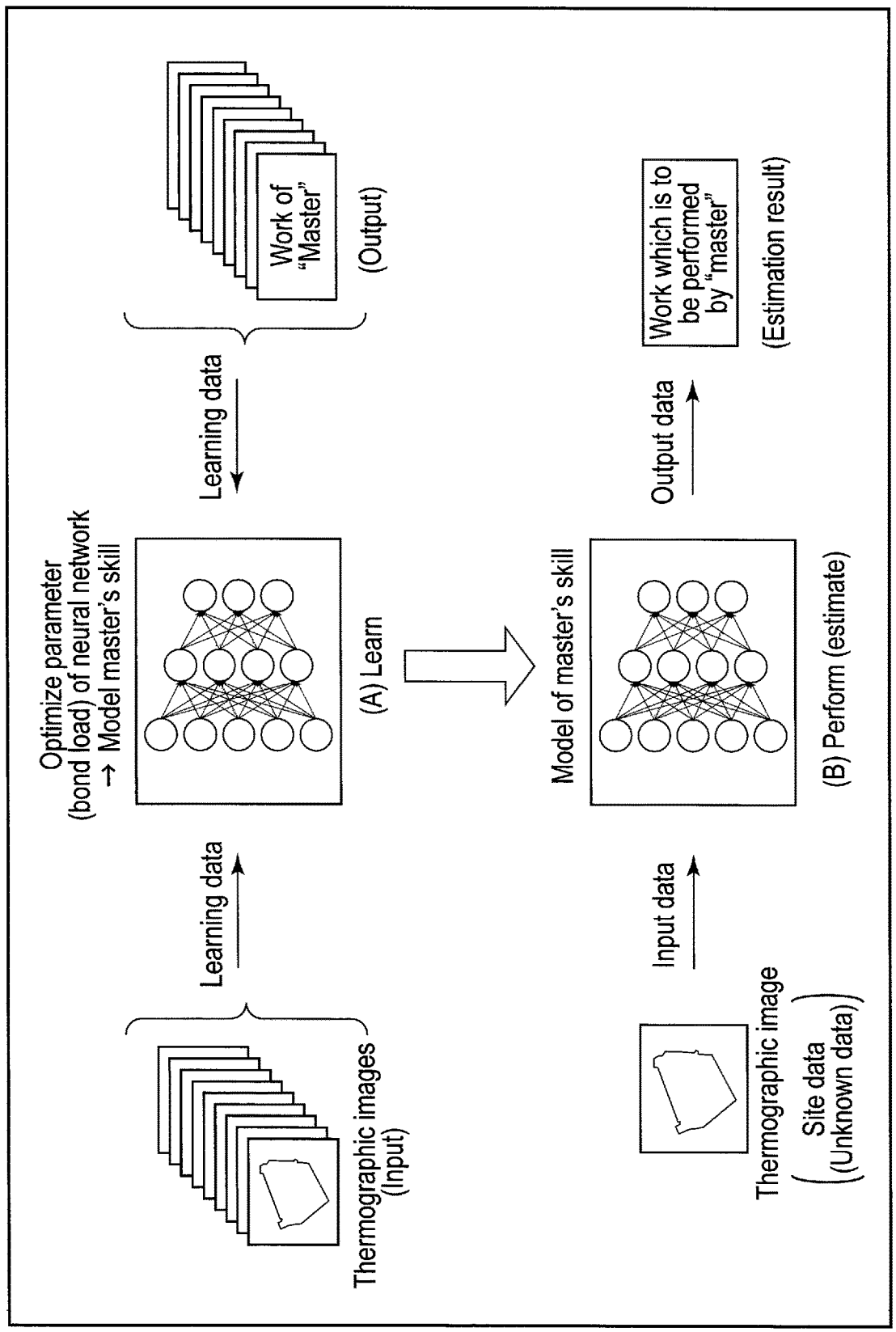
F I G. 3

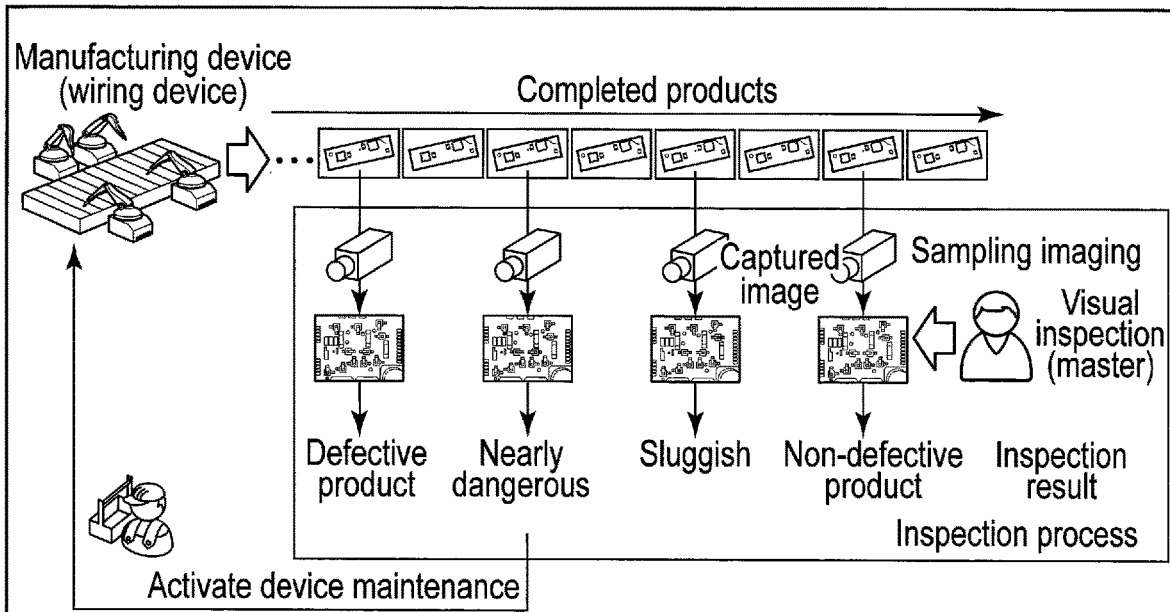
(A)
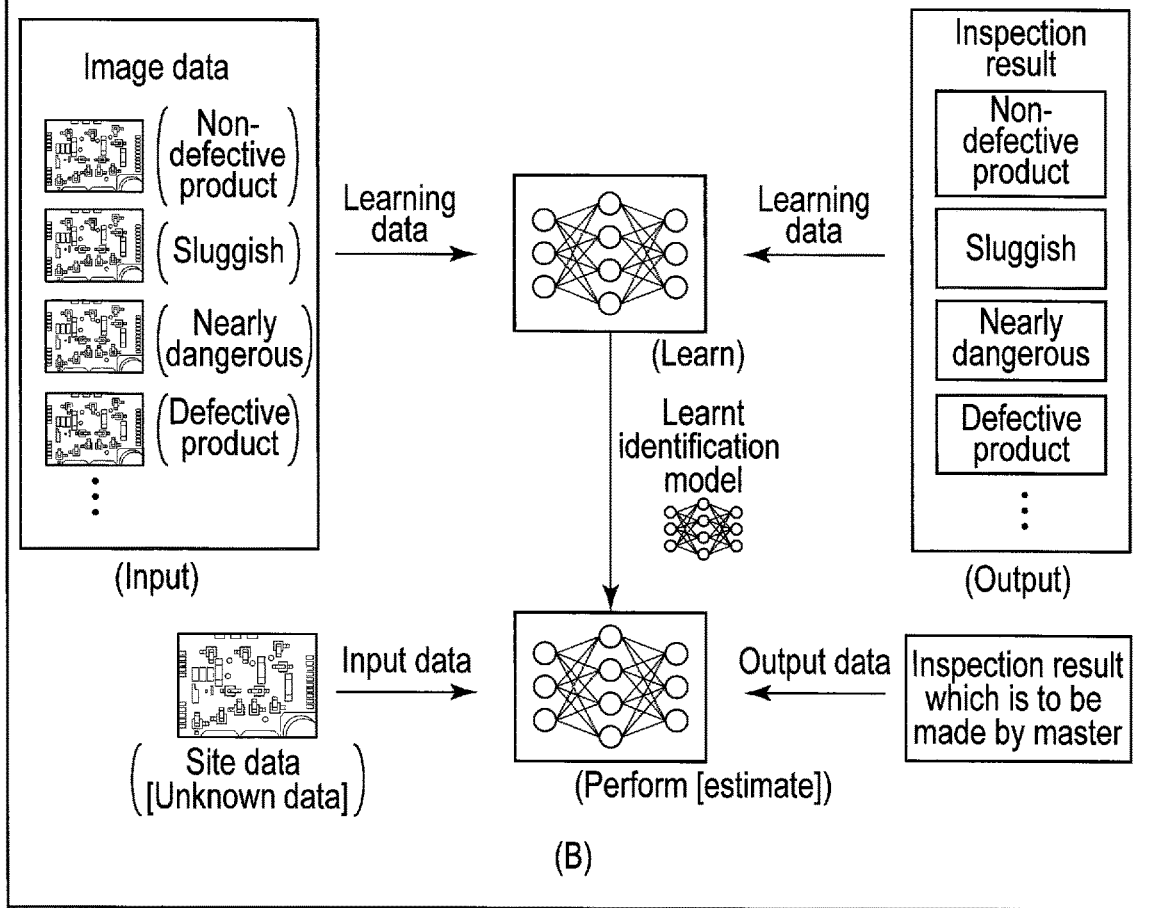
(B)
FIG. 4

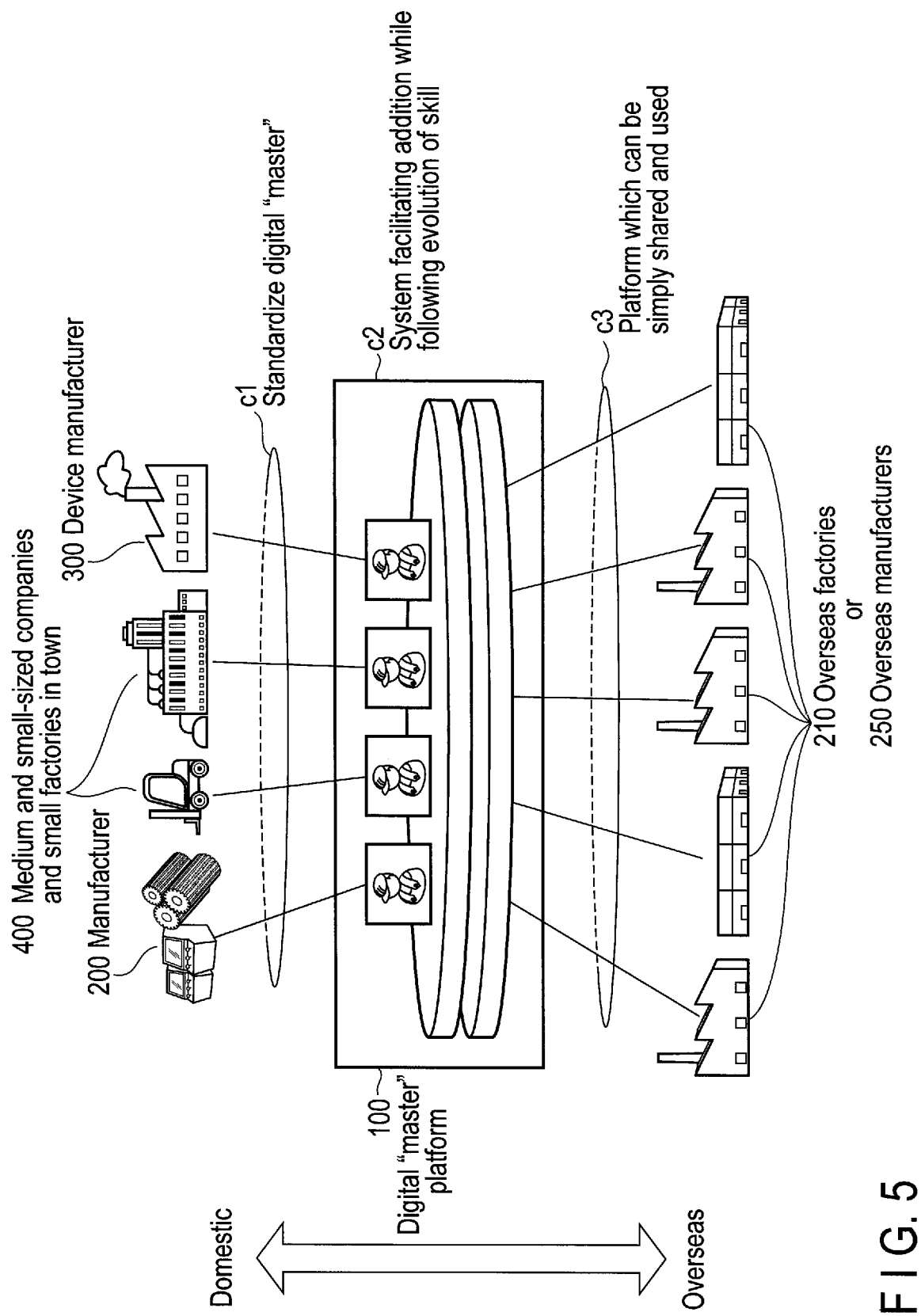
F I G. 5

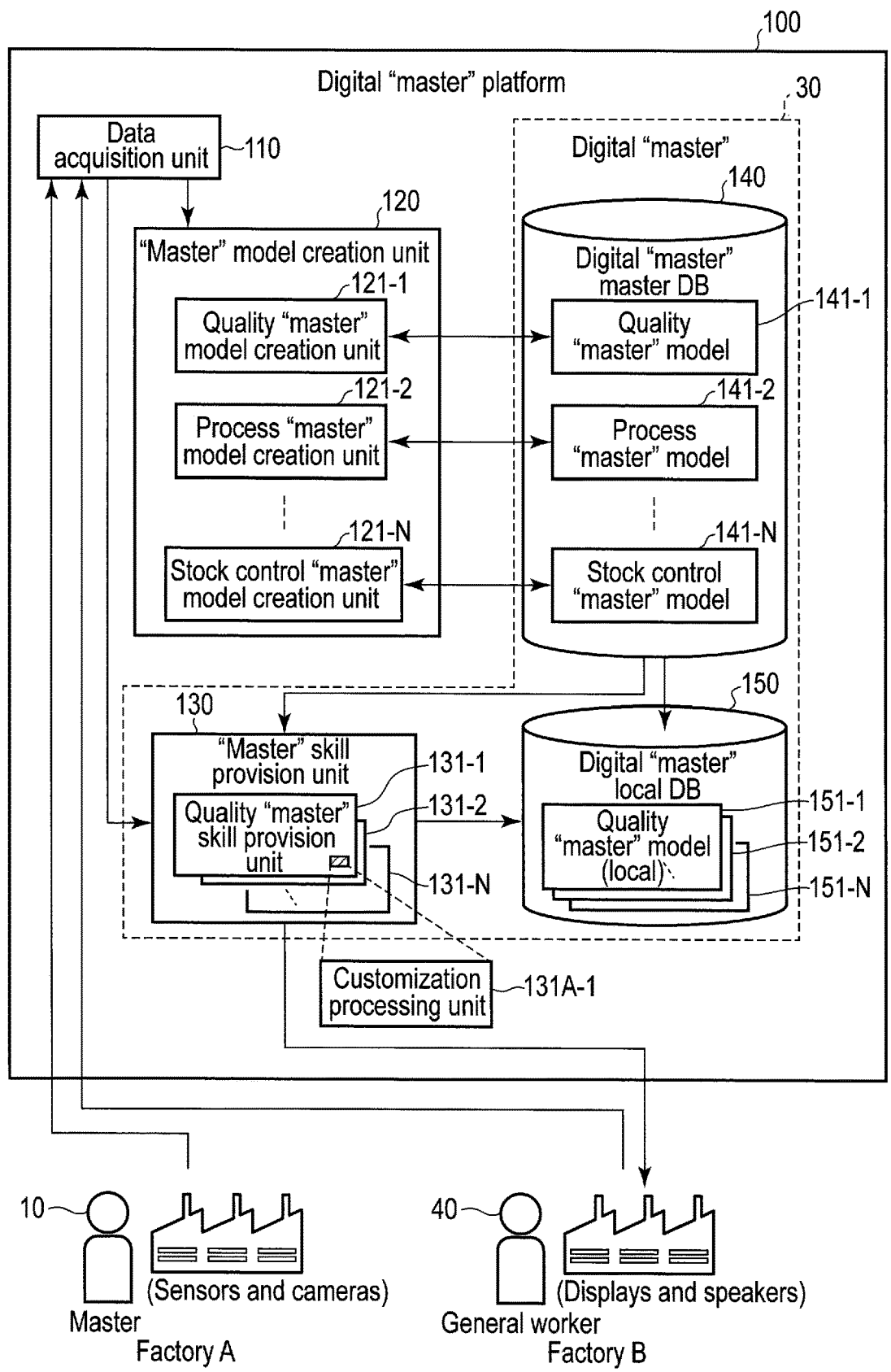
F I G. 6

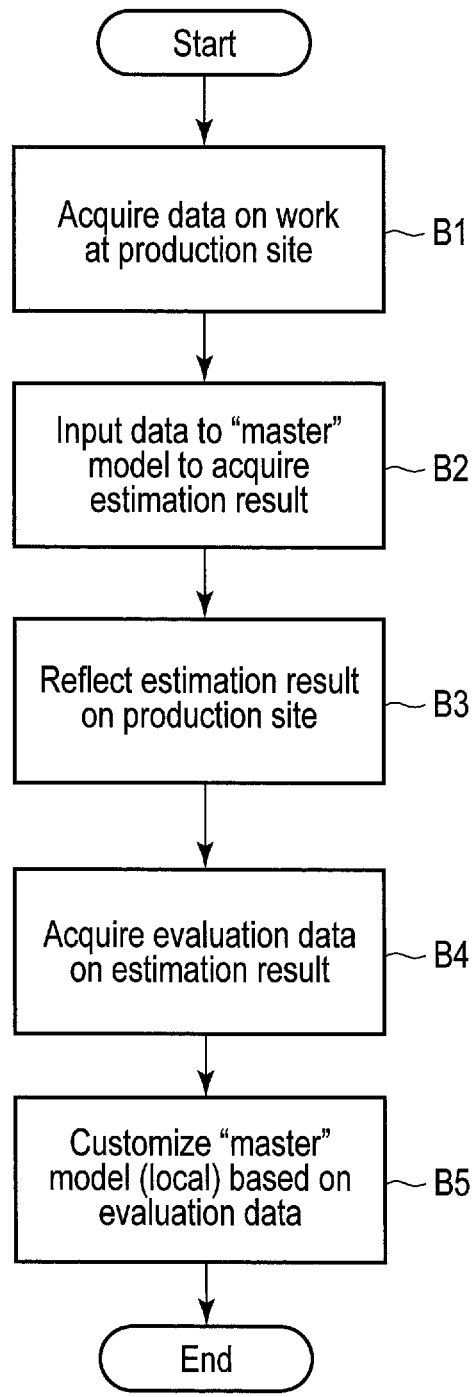
F I G. 9

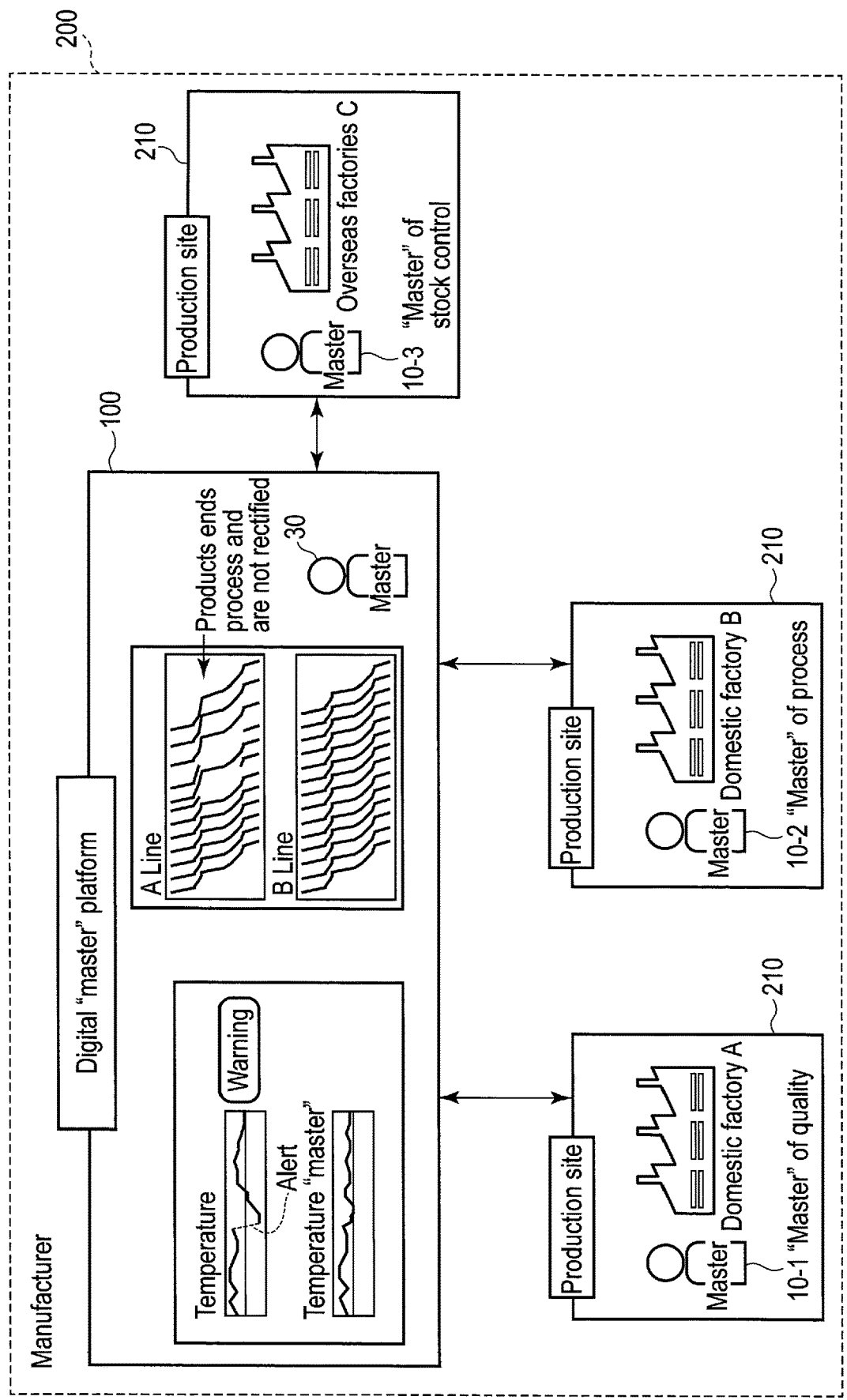
F I G. 10

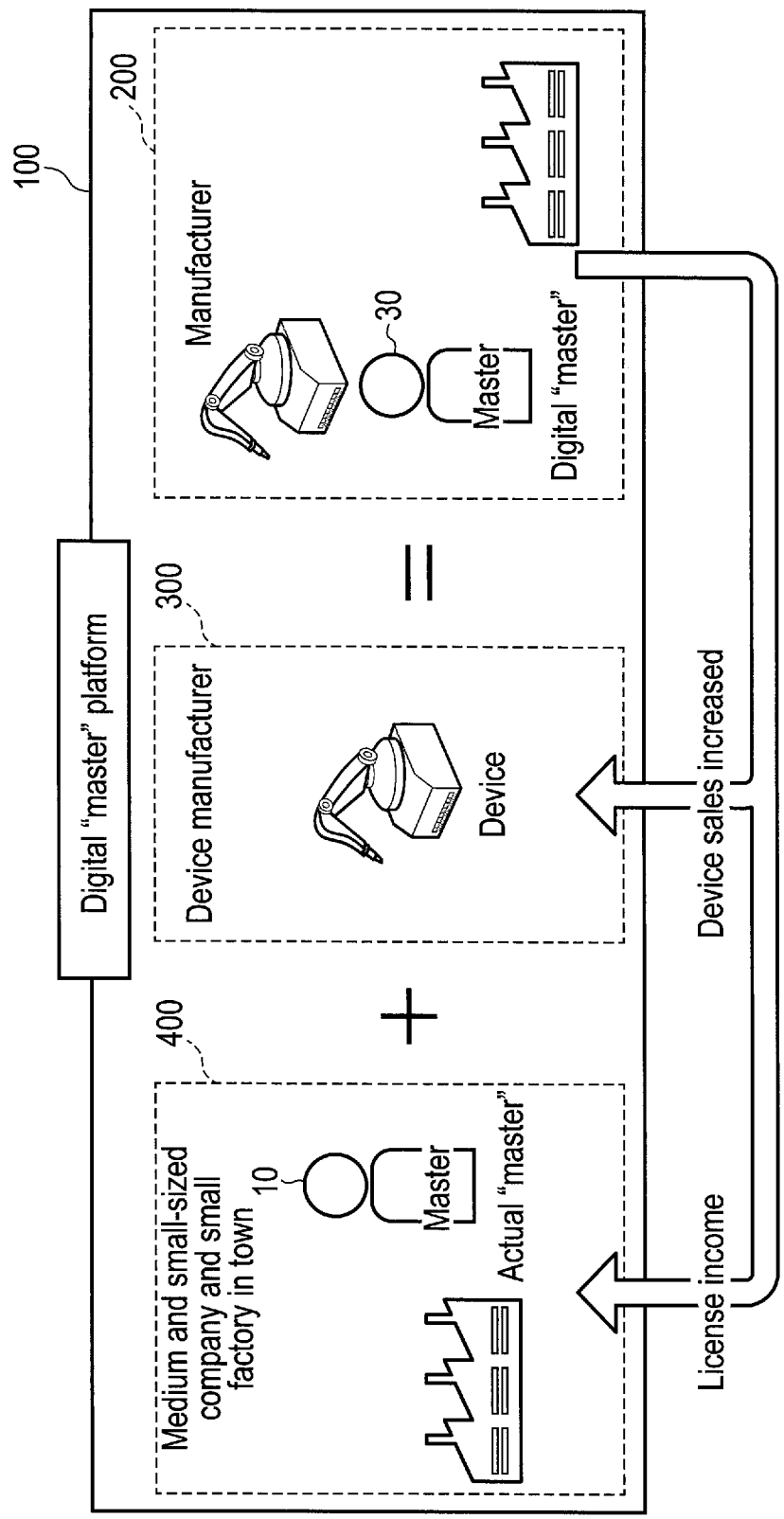
F I G. 13

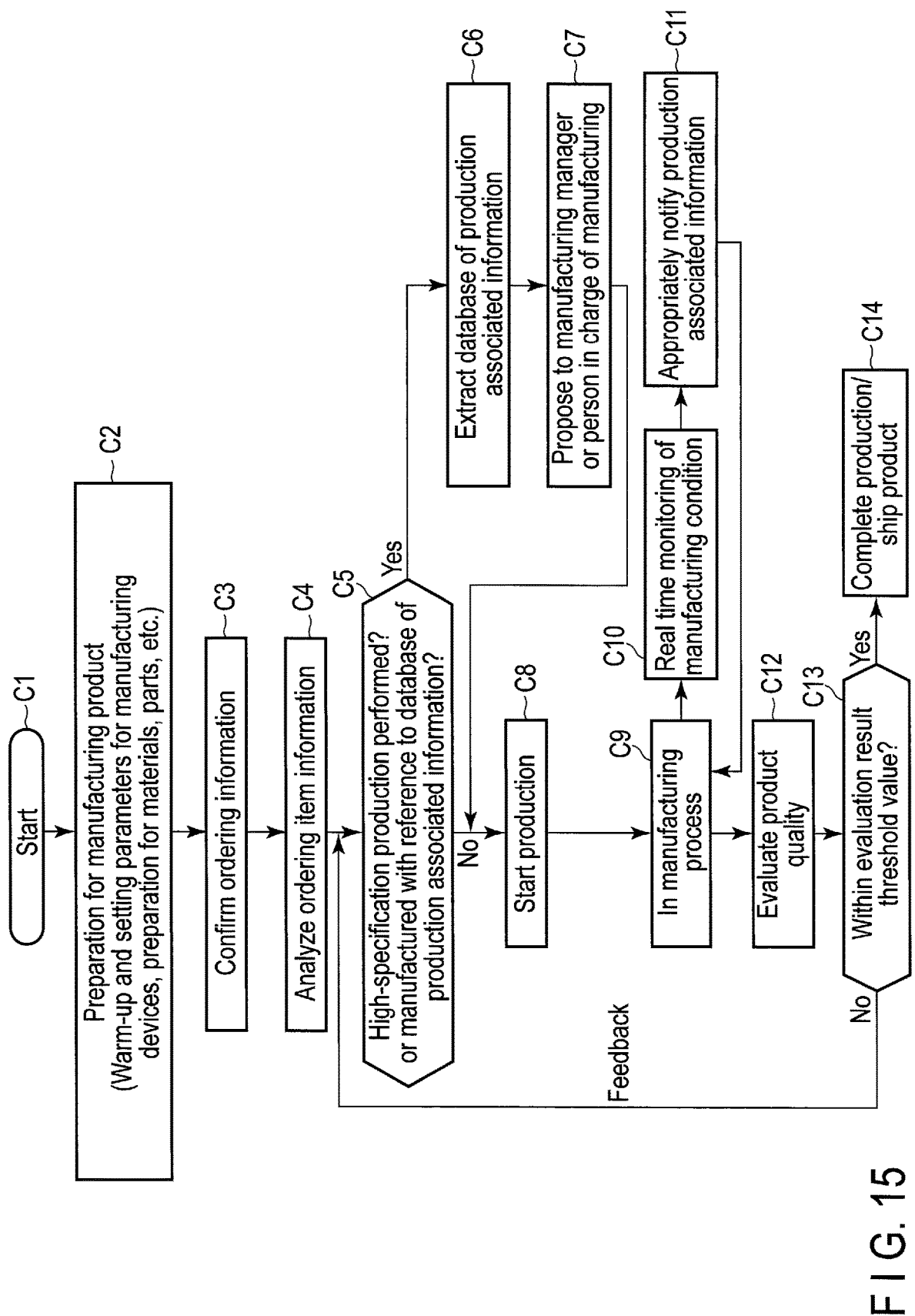
F I G. 15

Collect the data on masters' skills and construct data of superior skills of masters

| | Start | Work | End/Finish | Inspection test Evaluation data |
|---|---|---|---|---|
| | | 1612 → | | On each master of each item |
| 1601 — Material selection | | Material A, material B, material C… | | Evaluation A |
| 1602 — Processing | | ★Cut<br>★Amount of shaving<br>★Shaving timing<br>★Amount of bending<br>★Bending timing | | Evaluation B |
| 1603 — Items on masters' actual work — Condition | | ★Heating data (temperature variation, characteristic, time)<br>★Pressurization data (variation, characteristic, time)<br>★Amount of bending<br>★Bending timing | | Evaluation C |
| 1604 — Operation | | Motion data (change data)(characteristic) of handle<br>Switch operation data (change data)(characteristic) | | Evaluation D |
| 1605 — Assembly | | Timing of mounting<br>Mounting angle | | ⋮ |
| 1606 — Monitor — Video | | Video data of each unit, movement of master | | ⋮ |
| 1607 — Circumferential condition — Environment | | Room temperature, humidity, vibration, etc. at this time | | |

1611

F I G. 16

SKILL PLATFORM SYSTEM, SKILL MODELING DEVICE, AND SKILL DISSEMINATION METHOD

CROSS-REFERENCE TO RELATED APPLICATIONS

This application is a Continuation Application of PCT Application No. PCT/JP2018/041383, filed Nov. 7, 2018 and based upon and claiming the benefit of priority from Japanese Patent Application No. 2017-215263, filed Nov. 8, 2017, the entire contents of all of which are incorporated herein by reference.

FIELD

Embodiments described herein relate generally to a skill platform system, a skill modeling device and a skill dissemination method.

BACKGROUND

Recently, shortage of successors to the skills of the skilled workers becomes a serious problem due to declining birthrate and aging population, and the like, particularly, in the manufacturing industry. In contrast, a flow of globalization of developing production sites of high-quality products in the emerging countries and the like where increase of the production population is predicted advances, and this phenomenon also accelerates the problem of shortage of the skilled workers. The skilled worker having a superior skill is called "master" or the like.

In the manufacturing industry under the situation as described above, particularly, measures to disseminate the masters' skills temporarily and spatially, such as succession of the masters' skills to the next generation and dissemination of the masters' skills to foreign countries has been demanded.

BRIEF DESCRIPTION OF THE DRAWINGS

FIG. 3 is a diagram illustrating a summary of deep learning.

FIG. 4 is a diagram illustrating an example of modeling the master's skill in the manufacturing skill platform system of the embodiment.

FIG. 5 is a diagram schematically illustrating the manufacturing skill platform system of the embodiment.

FIG. 6 is a diagram illustrating a configuration example of the manufacturing skill platform system of the embodiment.

FIG. 9 is a flowchart illustrating an operation flow in a phase of utilizing the digital "master" 30 of the manufacturing skill platform system of the embodiment.

FIG. 10 is a diagram illustrating a first use case that can be assumed in the manufacturing skill platform system of the embodiment.

FIG. 13 is a diagram illustrating a fourth use case that can be assumed in the manufacturing skill platform system of the embodiment.

FIG. 15 is a flowchart illustrating a manufacturing process flow in the application system.

FIG. 16 is a diagram illustrating the other example of the concept of collecting data on a plurality of masters' skills and constructing superior skills of masters, in the application system.

DETAILED DESCRIPTION

Embodiments will be described hereinafter with reference to the accompanying drawings.

In general, according to one embodiment, a skill platform system includes a data acquisition unit, a model creation unit and a skill provision unit. The data acquisition unit is configured to acquire data on work of a skilled worker at a first site. The model creation unit is configured to perform modeling a skill of the skilled worker using the data acquired by the data acquisition unit. The skill provision unit is configured to provide the skill of the skilled worker to a second site by using the model created by the model creation unit.

Figure 1:
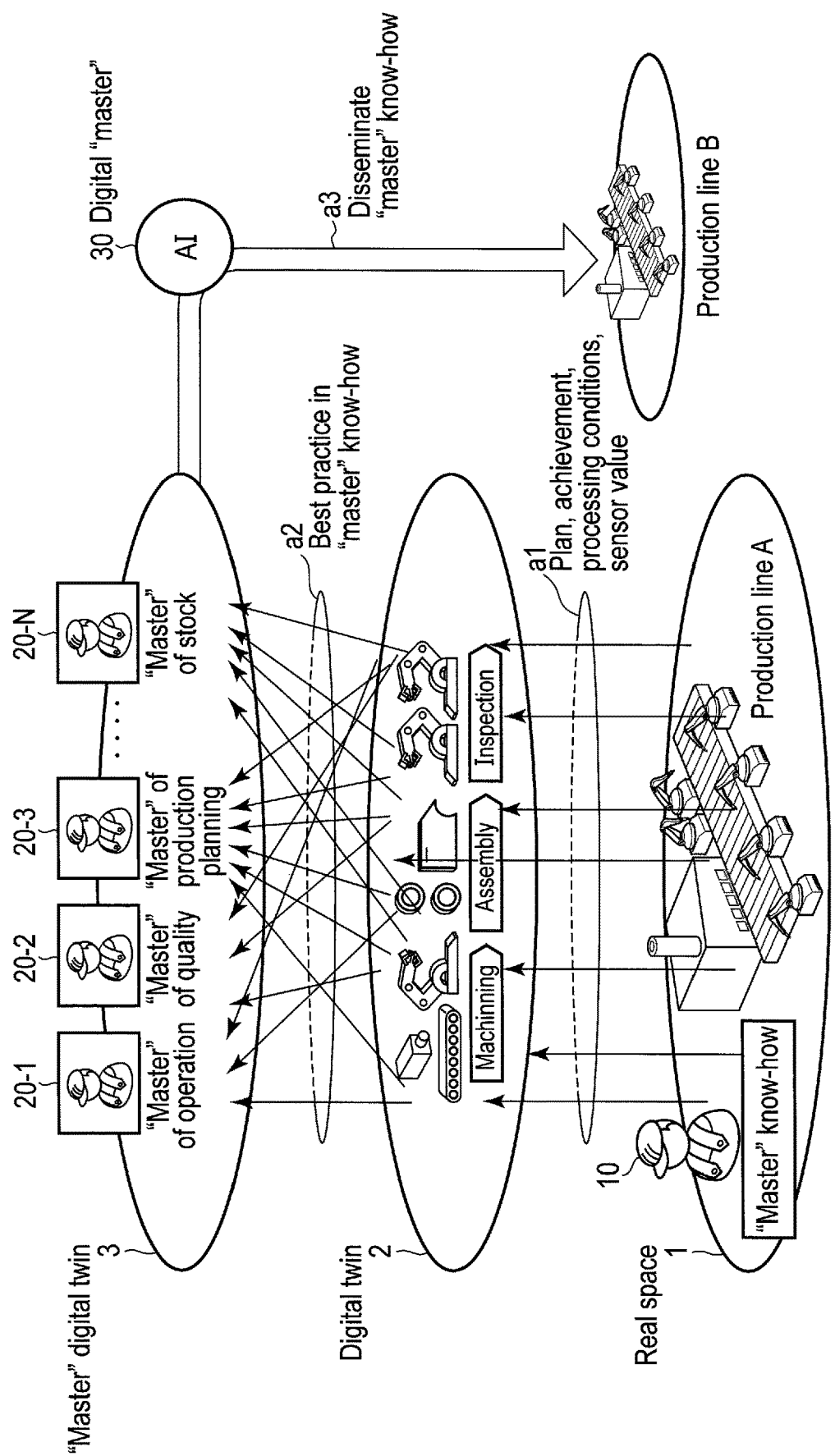
FIG. 1 is a diagram illustrating a concept of a manufacturing skill platform system of the embodiment.

FIG. 1 is a diagram illustrating a summary of a production skill platform system of the embodiment. The manufacturing skill platform system is referred to as a digital "master" platform in the following descriptions.

The digital "master" platform is, for example, a system implemented by combining the Internet of Things (IoT) technology and the Artificial Intelligence (AI) technology. Examples of the digital "master" platform are roughly classified into a phase to create a digital "master" 30 to be described later and a phase to utilize the digital "master" 30.

First, a summary of the phase to create the digital "master" 30 will be described.

The digital "master" platform constructs a digital twin 2 that reproduces, for example, the work performed by workers (including a master 10 having a superior skill, i.e., a real worker called "master") in real space 1 such as a manufacturing line A in cyberspace. Moreover, the digital "master" platform constructs a "master" digital twin 3 that reproduces the work performed by the master 10 in the real space 1, in the cyberspace, using data (a2) on the work performed by the master 10 in data (a1) acquired for construction of the digital twin 2. The skill of the master 10 includes unvisualized skill also called know-how.

Incidentally, the method of constructing the digital twins (2 and 3) is not limited to a specific method, but various known methods can be adopted. In addition, the IoT technology can be applied in the acquisition of data to construct the digital twins (2 and 3).

The data for constructing the digital twins (2 and 3) are, for example, the information on events that a worker recognizes by five senses such as watching, listening, and touching, the information on movement of a line of sight or a specific part of the worker, the information on the conditions of the device which the worker handles, the information on the achievement (including not only products, but plans and the like) of the worker, and the like. The movement of the line of sight or the specific site of the worker may be detected by, for example, mounting a sensor to a worker or may be detected from images of the worker captured by a camera. In other words, one of the data to construct the digital twins (2 and 3) may be an image captured by shooting a worker. In addition, when the movement of the line of sight of the worker is detected from an image, glasses mounted on the worker may be equipped with a camera to capture the image. As described above, the method of acquiring the data to construct the digital twins (2 and 3) is not limited to a specific method, but various known methods can be adopted. In addition, the method can be changed with the evolution of the IoT technology.

In addition, the data acquired to construct the digital twins (2 and 3) include data which belong to the input of the worker and data which belong to the output of the worker. For example, a case where the worker recognizes any events by five senses such as watching, listening, and touching and takes any actions will be considered. At this time, information on the event which the worker recognizes by five senses such as watching, listening, and touching is acquired as data which belong to the input of the worker. In parallel with this, information on any actions that the worker takes is acquired as data which belong to the output of the worker. For example, identification information and the like that enable a production base and an individual to be identified are added to the data thus acquired, which belong to the input or output of the worker. The identification information can be used in, for example, a process of extracting the data on the work performed by the master 10 (to construct the "master" digital twin 3) from the data of the digital twin 2.

Incidentally, FIG. 1 illustrates a situation that the master 10 is present in one production site (production line A) to make the descriptions easily understood, but masters 10 can be scattered in a plurality of production sites. In addition, a plurality of masters 10 may be present in one production site (FIG. 1 does not intend to illustrate only one master 10 present in the production line A). For example, as for the plurality of masters 10, persons having superior skills in various fields and processes such as "operation", "quality", "production planning", "stock" and the like are present together. Of course, these superior skills may come from each worker, but one worker may have a plurality of superior skills.

Masters 20 (20-1, 20-2, 20-3, . . . , 20-N) in the "master" digital twin 3 are a set of data on the work performed by the plurality of masters 10. For example, the digital "master" platform models each of the skills of the plurality of masters 10 by deep learning that handles the data of the masters 20 in the "master" digital twin 3 as learning data. The digital "master" 30 is a module for disseminating the skill of the master 10 using a neural network ("master" model) created by the modeling. The creation of the digital "master" 30 is substantially to model the skill of the master 10. In other words, the creation is to create a "master model".

For example, creation of the "master" model that models the skill of the master 10 working in the production line A, i.e., the digital master 30 will be considered. At this time, it is possible to estimate some action (output) that the master 10 would take from the information (input) on some event recognized by the worker with five senses such as watching, listening, and touching in a production line B where the master 10 is absent, and to reflect the estimation result on the production line B. In other words, the skill of the master 10 can be disseminated (a3). Incidentally, the production line B can also be recognized as a future production line A after retirement of the master 10. In addition, the AI technology can be applied in the modeling of the skill of the master 10.

An example of a superior skill of the master 10 will be described with reference to FIG. 2.

Figure 2:
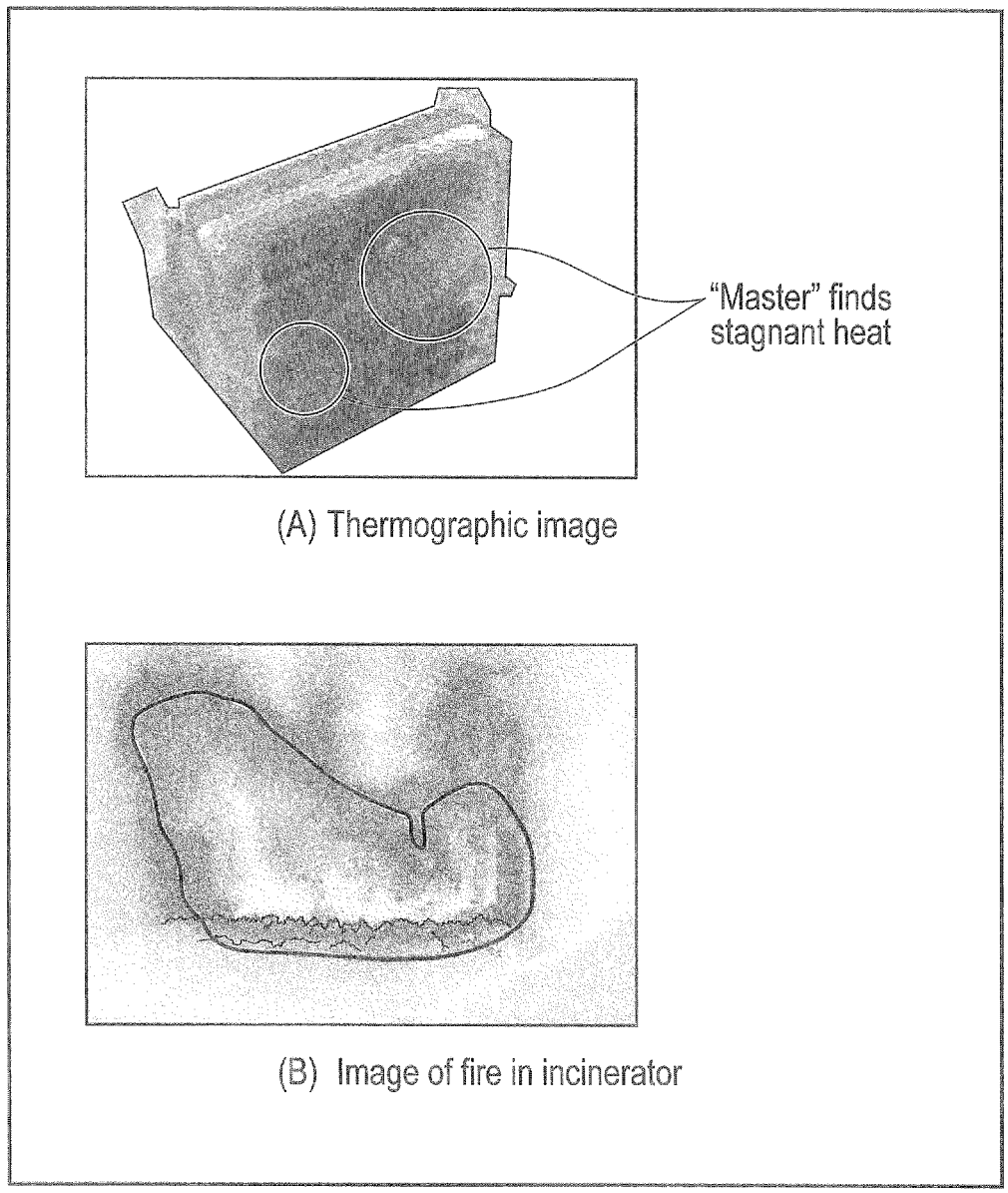
FIG. 2 is a diagram illustrating an example of a master's skill that can be modeled in the manufacturing skill platform system of the embodiment.

In FIG. 2, (A) is a diagram on the skill of the master 10 engaged in die casting production (metal mold casting), and (B) is a diagram on the skill of master 10 engaged in refuse incineration. More specifically, FIG. 2 is a diagram illustrating an event (image) that the master 10 recognizes with the sense of sight.

In the die casting production, a defective product is generated due to a delicate change of the die temperature. The master 10 engaged in the die casting production finds stagnant heat by thermography and controls a device. In addition, harmful substances are caused by incomplete combustion. The master 10 engaged in refuse incineration fire adjusts injection of refuse and air while watching the condition of flame.

The digital "master" platform models such a skill of the master 10, allows the stagnant heat to be found even by a worker who is not the master 10, in the die casting production, and enables a monitoring person who performs remote monitoring (without depending on the master 10) to control an incinerator in the refuse incineration.

Incidentally, the example of acquiring the data on the work performed by the master 10 via the digital twin 2 which reproduces the work in the real space 1 on cyberspace has been described, but the data on the work performed by the master 10 may not be acquired via the digital twin 2. Alternatively, a limited digital twin to reproduce the only work performed by the master 10 in the real space 1 on cyberspace, i.e., the "master" digital twin 3 may be constructed directly without construction of the digital twin 2.

Modeling the skill of the master 10 will be described with reference to FIG. 3 and FIG. 4. FIG. 3 is a diagram illustrating a summary of deep learning. Deep learning is the generic name of the machine learning method using the neural network.

For example, the master 10 engaged in the die casting production finds stagnant heat by the thermography and controls the device as described above. In this case, when a thermographic image is considered as the input of the master 10 and a content of control of the device (work of the "master") is considered as the output of the master 10, a parameter of the neural network is optimized by using a large quantity of combinations of the input and the output as the learning data in deep learning ((A) learn). In this example, the parameter is the bond load between neurons. In other words, modeling the skill of the master 10 in the present embodiment is to create a neural network where the bond load between neurons is optimized. Then, the neural network thus created where the bond load between the neurons is optimized is called a "master" model.

According to the "master" model in which the skill of the master 10 engaged in the die casting production is modeled, it is possible to estimate the content of the control of the device which the master 10 would perform, from a thermographic image (unknown data) that is not included in the learning data ((B) perform (estimate)). Therefore, even a worker who is not the master 10 can find stagnant heat. In addition, the "master" model can evolve beyond the level of the skill of master 10 by feeding back evaluation (evaluation data) of the estimation result of the "master" model as the learning data and continuing deep learning.

Incidentally, for example, a fully connected type (FC: Fully Connected Neural Network), a convolutional type (CNN: Convolutional Neural Network), a recurrent type (RNN: Recurrent Neural Network), a self-encoding type (AE: Auto Encoder), and the like are known as the architecture of the neural network. One of these may be applied or a combination of two or more may be applied.

In addition, FIG. 4 is a diagram illustrating an example of modeling the skill of the master 10 of a visual inspection in a process of inspecting completed products. A wiring device for providing interconnects on a printed circuit board is assumed as a manufacturing device.

The master 10 can determine not only the completed products as non-defective products or defective products by visual inspection, but accurately determine the time of maintenance of the wiring device (A). Without the skill of the master 10, maintenance may be delayed and a number of defective products may be generated and, oppositely, the production efficiency may be reduced by excessively performing maintenance.

Thus, the skill of the master 10 is modeled by deep learning using an image of the completed product which the master 10 visually inspects as the input, the inspection result of the master 10 (including the result of determining the completed product as the non-defective product or defective product, and the result of determining the time of maintenance of the wiring device or not) as the output, and using a combination of the input and the output as a large quantity of learn data. In other words, the "master" model corresponding to the skill of this master 10 is created.

When the "master" model is created, whether the completed product is the non-defective product or the defective product can be determined from the image of the completed product, and the time of maintenance of the wiring device can be determined accurately (B).

Next, a summary of a phase of utilizing the digital "master" 30 will be described.

The digital "master" platform provides the skill of the master 10 by the "master" model created for the digital "master" 30, so as to enable the work to be performed by the skill (hereinafter simply referred to as "skill of the master 10") of the level equal to or higher than the level of the master 10 in the real space 1 where the master 10 is absent. For example, the digital "master" platform estimates the work which the worker should perform by the "master" model, from the information on the event which the worker in the real space 1 with five senses such as watching, listening, and touching, and notifies the worker in the real space 1 of the estimation result. The notification of the estimation result of the "master" model may be, for example, to transmit data to send an instruction to the worker by an image and voice.

FIG. 5 is a diagram schematically illustrating a digital "master" platform 100 to disseminate the skill of the master 10 by the digital "master" 30.

As illustrated in FIG. 5, the digital "master" platform 100 collects the skills of the masters 10 scattered, by connecting domestic manufacturers 200, device makers 300 and medium and small-sized companies and small factories in town 400, and overseas production sites (overseas factories) 210 and overseas manufacturers 250, and the like, and standardizes the skills by modeling (c1). In addition, the digital "master" platform 100 follows the evolution of the skills of the masters 10 (appearance of a new skill) and implements a mechanism which can incorporate the evolution (c2). Then, the digital "master" platform 100 plays a role as a platform which can exchange the skills of the masters 10 or share and utilize the skills of the masters 10, for example, among production sites (c3).

FIG. 6 is a diagram illustrating a configuration example of the digital "master" platform 100.

The digital "master" platform 100 is a system constructed by, for example, a computer called a server or the like, and comprises processing units, i.e., a data acquisition unit 110, a "master" model creation unit 120, and a "master" skill provision unit 130 and database units, i.e., a digital "master" master DB (DataBase) 140 and a digital "master" local DB 150 as illustrated in FIG. 6. The data acquisition unit 110 and the "master" model creation unit 120 function as skill modeling devices that creates and stores a "master" model 141 to be described later in the digital "master" master DB 140. The digital "master" platform 100 may be a system constructed by one computer or may be a system constructed by a plurality of computers that can collaborate, for example, through a network for, for example, load distribution or the like. In the system constructed by a plurality of computers, all components illustrated in FIG. 6 may be arranged in a plurality of computers or the configuration illustrated in FIG. 6 may be distributed over a plurality of computers. In addition, for example, computers having a large-capacity storage called file servers or the like may be incorporated in a plurality of computers and the data units (digital "master" master DB 140 and digital "master" local DB 150) of the digital "master" platform 100 may be arranged. Several or all of the processing units (data acquisition unit 110, "master" model creation unit 120, "master" skill provision unit 130) of the digital "master" platform 100 may be implemented by urging the processor to execute programs in which procedures of the respective units are described, or may be implemented by dedicated electronic circuits. An example of the hardware configuration of the digital "master" platform 100 is illustrated the FIG. 7.

Figure 7:
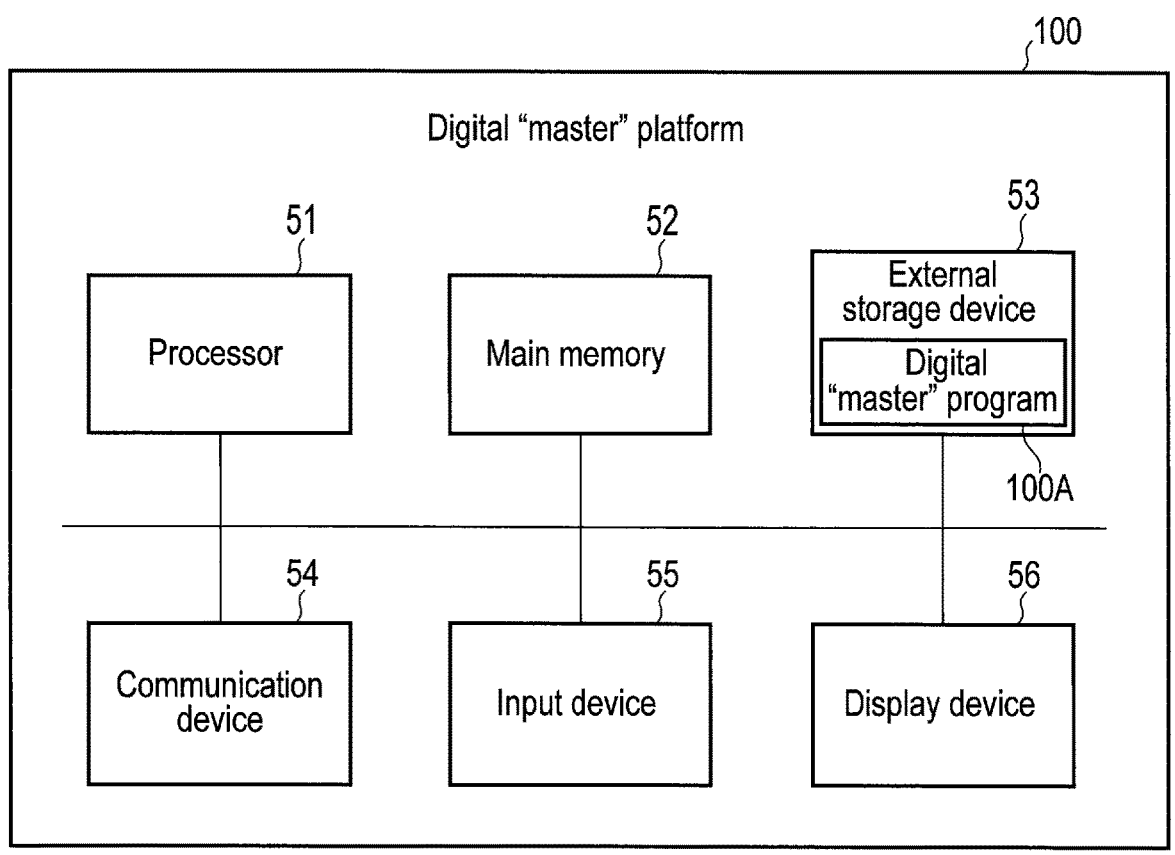
FIG. 7 is a diagram illustrating an example of a hardware configuration of the manufacturing skill platform system of the embodiment.

As illustrated in FIG. 7, the digital "master" platform 100 comprises a processor 51, a main memory 52, an external storage device 53, a communication device 54, an input device 55, a display device 56, and the like. Incidentally, as described above, the digital "master" platform 100 may be constructed by a plurality of computers (a server, a file server, and the like), and the FIG. 7, merely, schematically illustrates the hardware configuration example.

It is assumed that in the digital "master" platform 100, the digital "master" program 100A stored in the external storage device 53 is loaded from the external storage device 53 to the main memory 52 and is executed by the processor 51, and each processing unit illustrated in FIG. 6 is thereby implemented. In addition, it is assumed that the data units (digital "master" master DB 140 and digital "master" local DB 150) illustrated in FIG. 6 is constructed in the external storage device 53.

The communication device 54 is a device which executes, for example, communication with factory A and factory B illustrated in FIG. 6, and the like. The input unit 55 is a device which allows an operator managing the digital "master" platform 100, and the like to perform input of the information including commands. The display unit 56 is a device which performs output of the information to the operator and the like.

The descriptions will return to FIG. 6 and continue.

The data acquisition unit 110 is a module which acquires the data on the work of the workers in each production site. In FIG. 6, the factory A is a production site where the master 10 is present, and the factory B is a production site where the master 10 is absent. In FIG. 6, a worker other than the master 10 is referred to as a general worker 40. Incidentally, one factory A and one factory B are illustrated in FIG. 6 to make the descriptions easily understood but, in fact, a plurality of production sites where masters 10 are present, which are represented as factories A, and a plurality of production sites where masters 10 are absent, which are represented as factories B, are present. In addition, the factory A and the factory B can also be considered as the same production sites and a current production site (of the practicing master 10) and a future production site (of the master 10 having retired). Then, to make the descriptions easily understood, similarly, it is illustrated in FIG. 6 that the data acquisition unit 110 directly acquires data from each of the production sites (factory A and factory B), but the data acquisition unit 110 acquires the data via the digital twin 2 or the "master" digital twin 3 illustrated in FIG. 1. For example, identification information and the like that can identify the production sites and individuals are added to the data of the digital twins (2 and 3), and the data acquisition unit 110 acquires target data from the digital twins (2 and 3) based on the identification information. Illustration and description of modules constructing the digital twins (2 and 3) are omitted here. The data acquisition unit 110 may acquire the data, for example, directly from each of the production sites (factory A and factory B) through a network such as the Internet, instead of acquiring the data via the digital twins (2 and 3).

The "master" model creation unit 120 is a module that models the skill of the master 10 by deep learning using as the learning data the data acquired by the data acquisition unit 110, more specifically, the data on the work performed by the master 10 in the factory A. In other words, the unit is a module which creates the "master" model.

The "master" model creation unit 120 creates, for example, "master" data for each work of various fields and processes as "quality", "process" and "stock control". More specifically, the "master" model creation unit 120 comprises work-specific "master" model creation units 121 (121-1, 121-2, . . . , 121-N) provided for respective works of various fields and processes. Each of the work-specific "master" model creation units 121 models the skill of the master 10 by deep learning using the data (data of master 20) on the work performed by the master 10, which is acquired from the digital twin 3, as the learning data to create a "master" model. The "master" models created by the work-specific "master" model creation units 121 are stored in the digital "master" master DB 140 as the "master" models 141 (141-1, 141-2, . . . , 141-N).

In addition, the "master" model creation unit 120 can adaptively increase or decrease the work-specific "master" model creation units 121. More specifically, the "master" model creation unit 120 can delete a work-specific "master" model creation unit 121 on the skill which becomes unnecessary, or add a work-specific "master" model creation unit 121 on a skill which requires a "master" model 141 to be newly created. In other words, in accordance with the evolution of skill (appearance of a new skill) of master 10, the evolution can be incorporated.

The "master" skill provision unit 130 is a module that provides the skill of the master 10 by the "master" model 141 created by the "master" model creation unit 120. The "master" skill provision unit 130 can provide, for example, the skill of the "master" 10 in work units of various fields and processes such as "quality", "process" and "stock control". For this reason, the "master" skill provision unit 130 comprises work-specific "master" skill provision units 131 (131-1, 131-2, . . . , 131-N) provided for each work of various fields and processes. In addition, the work-specific "master" skill provision units 131 comprise customization processing units 131A (131A-1, 131A-2, . . . , 131A-N), respectively. The customization processing unit 131A comprises a deep learning function that is equal to that of the work-specific "master" model creation unit 121. When starting providing the skill using the "master" model 141 for a certain production site, the work-specific "master" skill provision unit 131 reads the "master" model 141 from the digital "master" master DB 140, creates a duplication ("master" model (local) 151) and stores the duplication in the digital "master" local DB 150. The work-specific "master" skill provision unit 131 provides the skill of the master 10 by the "master" model (local) 151 stored in the digital "master" local DB 150. The customization processing unit 131A acquires data on the evaluation of the estimation result of the "master" model (local) 151 via the data acquisition unit 110, continues deep learning using the data as learning data, and customizes the "master" model (local) 151 for the production site. Thus, for example, the "master" model (local) 151 can be adapted to environment, and the like of each production site. As a result, an optimum skill customized for each production site can be obtained by directly reflecting a necessary skill from the site of each work.

In addition, the work-specific "master" skill provision unit 130 evaluates the work at each production site. The work-specific "master" skill provision unit 130 performs evaluation by comparing the estimation result of the "master" model (local) 151 with the data on the work in the production site acquired by the data acquisition unit 110. By this evaluation, it can be determined that, for example, a certain production site has a skill for working based on the "master" model (local) 151, but a certain production site does not have a skill for working based on the "master" model (local) 151.

Figure 8:
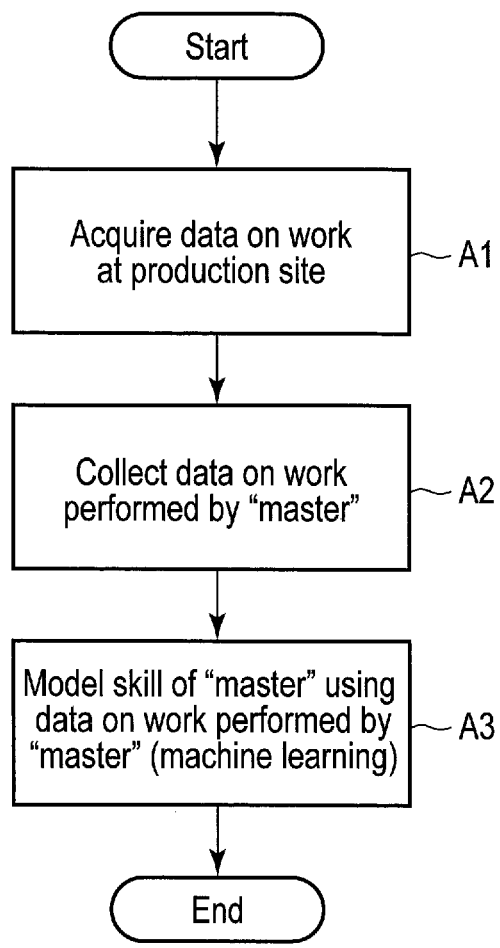
FIG. 8 is a flowchart illustrating an operation flow in a phase of creating a digital "master" 30 of the manufacturing skill platform system of the embodiment.

FIG. 8 is a flowchart illustrating the operation flow in the phase to create the digital "master" 30 of the digital "master" platform 100.

The digital "master" platform 100 first acquires the data on the work in the production site (step A1). Next, the digital "master" platform 100 collects the data on the work performed by the "master" 10 from the acquired data (step A2).

Then, the digital "master" platform 100 models the skill of the "master" by deep learning using the collected data on the work performed by the "master" as the learning data (step A3). Modeling the skill of the "master" is what is called creation of the digital "master" 30.

In addition, FIG. 9 is a flowchart illustrating an operation flow in the phase to utilize the digital "master" 30 of the digital "master" platform 100. The digital "master" platform 100 acquires the data on the work in the production site (of a destination provided with the skill by the "master" model 141) (step B1), and inputs the acquired data to the "master" model 141 (local) to acquire the estimation result (step B2).

The digital "master" platform 100 reflects the acquired estimation result on the production site (step B3) and acquires the evaluation data on the estimation result (step B4). The digital "master" platform 100 customizes the "master" model 141 (local) for the production site by deep learning using the acquired evaluation data as the learning (step B5).

Thus, the digital "master" platform 100 (manufacturing skill platform system) of the present embodiment can disseminate the skill of the master temporarily and spatially.

Next, several use cases that can be assumed in the digital "master" platform 100 will be described.

(First use case) First, a first use case that can be assumed in the digital "master" platform 100 will be described with reference to FIG. 10.

The first use case is the case where the manufacturer 200 applies the digital "master" platform 100 to disseminate the skill of the master 10 among the production sites 210 in a company.

It is assumed that, for example, the master 10 (10-1) having a superior technique on "quality", the master 10 (10-2) having a superior technique on "process", and the master 10 (10-3) having a superior technique on "stock control" are scattered in different production sites 210 inside the company.

In such a case, the skills of the masters 10 are shared by the digital "master" platform 100. More specifically, for example, the skill of the master 10 having a superior technique on "quality" is modeled and accumulated as the "master" model 141 for the digital "master" 30, in the digital "master" platform 100. The skills of the masters having the superior techniques on "process" and "stock control" can also be supplemented in the same manner. Then, when the skills of the masters 10 are accumulated on the platform 100 as the "master" models 141 on "quality", "process", and "stock control", respectively, the production site 210 where the master 10 having a superior technique on "quality" (master 10 of "quality") is absent, can supplement the skill of the master 10 of "quality" with the "master" model 141 corresponding to the skill of the master 10 of "quality". The skills of the masters having the superior techniques on "process" and "stock control" can also be supplemented in the same manner.

Thus, the improvement and uniformity of quality of the product of the manufacturer 200, and the improvement of productivity of the manufacturer 200 can be implemented by disseminating the skills of the masters 10 through the "master" models 141 among the production sites 210 inside the company by the digital "master" platform 100. In addition, for example, startup and expansion of new production sites 210 (difficult to dispatch the masters 10) such as overseas factories can be facilitated by constructing the digital "master" platform 100 which disseminates the skills of the masters 10.

Figure 11:
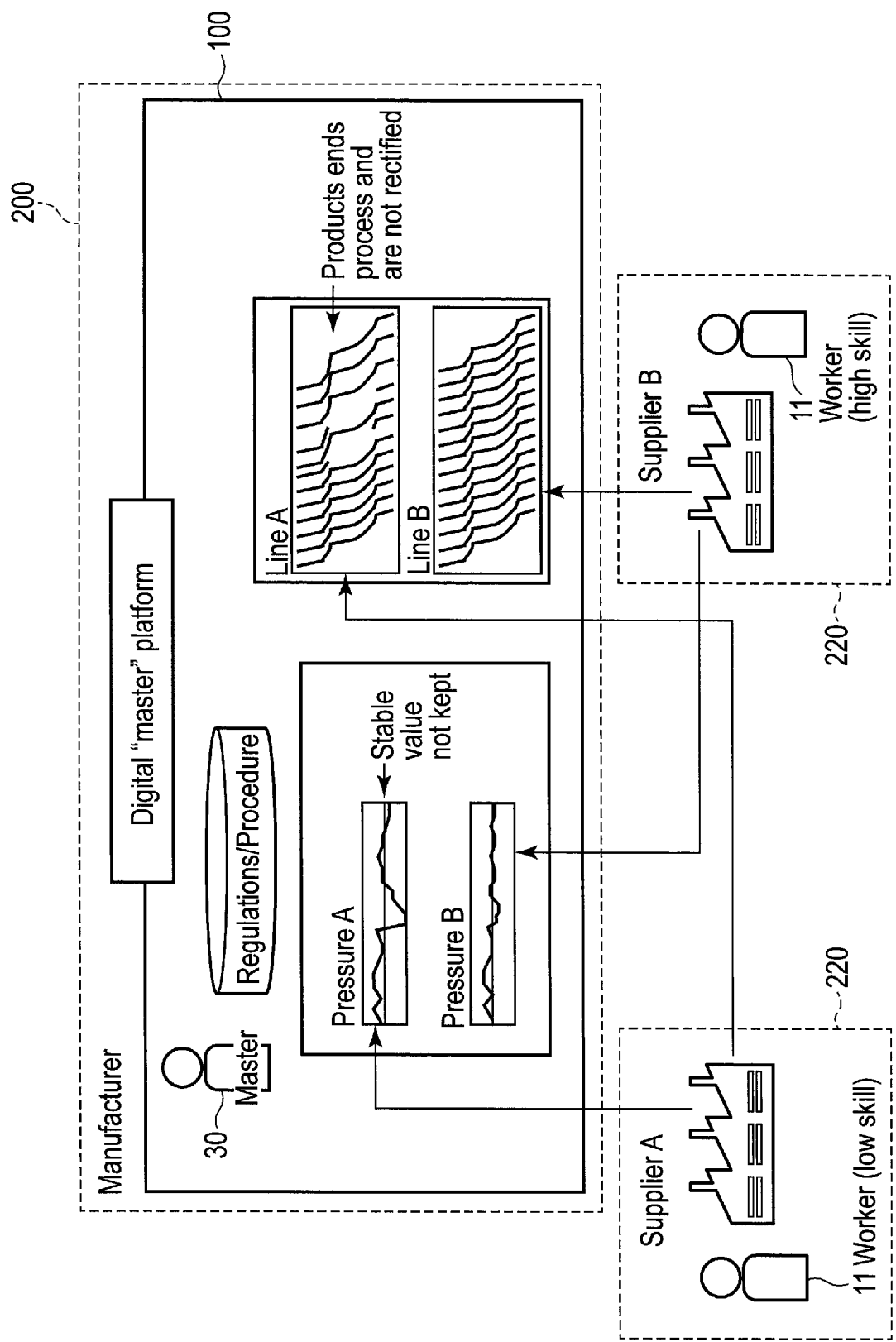
FIG. 11 is a diagram illustrating a second use case that can be assumed in the manufacturing skill platform system of the embodiment.

(Second use case) Next, a second use case that can be assumed in the digital "master" platform 100 will be described with reference to FIG. 11.

The second use case is the case where the manufacturer 200 applies the digital "master" platform 100 to attempt cooperation between suppliers (component makers, outsourcing destinations, and the like) 220.

For example, when an order is placed to a plurality of suppliers 220, it must be avoided that the products of the suppliers 220 may be varied in quality. More specifically, the quality of all the products of the suppliers 220 must be beyond a standard. As the measure, the master 10 is often dispatched from the manufacturer 200 to instruct the workers 11 of the suppliers 220.

In addition to the improvement and uniformity of quality of the products which is raised in the first use case, the costs for the instruction of the skill to the suppliers 220 can be reduced by constructing the digital "master" platform 100, modeling and accumulating the skill of the master 10 as the "master" model 141 for the digital "master" 30, and providing the skill of the master 10 to each of the suppliers 220 through the "master" model 141.

In addition, since the digital "master" platform 100 can provide the skill of the master 10 through the "master" model 141 in a work unit of the fields and the processes, for example, the skill of the master 10 can be provided while excluding the skill that is not wanted to flow outside the company from the "master" model 141. Furthermore, charging the suppliers 220 can also be performed in accordance with the number of skills provided.

In addition, since the work in the production site can be monitored and evaluated in the digital "master" platform 100, for example, graduated order of increasing the number of ordering to the supplier 220 having a higher skill of performing the work based on the "master" model 141 and capable of manufacturing the products of higher quality (A supplier<B supplier) can also be performed easily.

Figure 12:
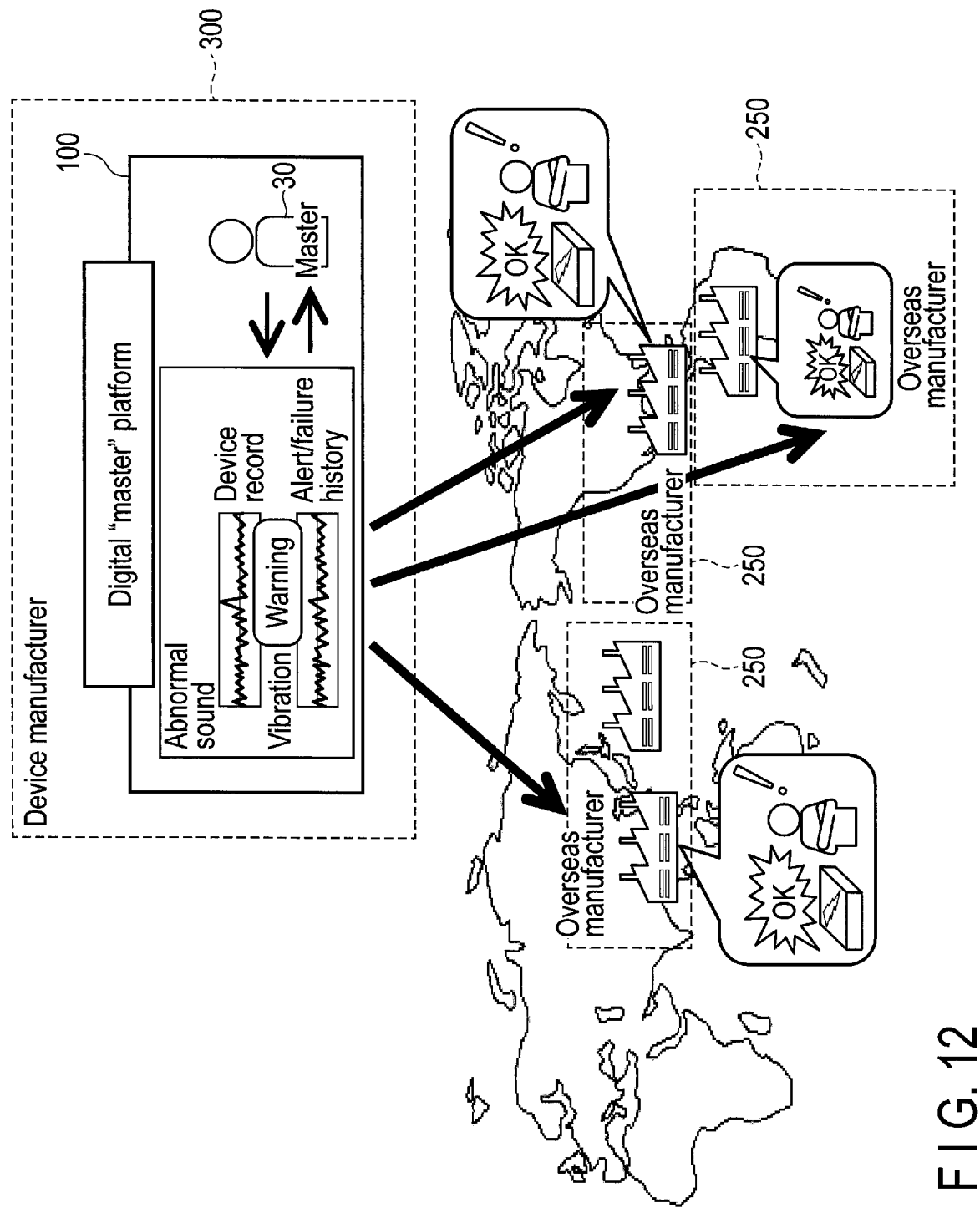
FIG. 12 is a diagram illustrating a third use case that can be assumed in the manufacturing skill platform system of the embodiment.

(Third use case) Next, a third use case that can be assumed in the digital "master" platform 100 will be described with reference to FIG. 12.

The third use case is the case where the device maker 300 applies the digital "master" platform 100 for, for example, sales promotion to the overseas manufacturers 250, and the like.

For example, it often obstacles to the sales that no human resources capable of using the device are present on the overseas manufacturer 250 side (including the maintenance), when the device is to be sold to foreign countries manufacturer 250 and the like.

When the digital "master" platform 100 is constructed, the skill of the master 10 can be provided to the production sites of the remote locations through the "master" model 141a and a set of the skill of the master 10 and the device can be sold. Thus, the number of sales of the device can be increased.

Incidentally, since the work in the production sites of the remote locations can be monitored and evaluated in the digital "master" platform 100, and it can be evaluated, substantial after sales service such as adaptively notifying the time of maintenance and the maintenance method can be provided. Providing such after sales service can also help the number of sales of the device increase.

(Fourth Use Case)

Next, a fourth use case that can be assumed in the digital "master" platform 100 will be described with reference to FIG. 13.

The fourth use case is the case where the device maker 300 applies the digital "master" platform 100 to take in devices which are to be sold to the manufacturer 200 the skill of the master 10 at a small-sized production site such as a medium and small-sized company and small factory in town 400 or the like having a risk for succession of the skill due to shortage of successors and the like. Taking the skill of the master 10 in the device is to enable the manufacturer 200 to be provided with the skill of the master 10 after the device maker 300 delivers the device. In other words, taking the skill of the master is to model the skill of the master 10 as the "master" model 141 for the digital "master" 30 and to accumulate the model in the digital "master" platform 100.

In the fourth use case, the medium and small-sized company and small factory in town 400, the device maker 300, and the manufacturer 200 are connected by the digital "master" platform 100, such that each of the three parties can obtain merits. More specifically, the medium and small-sized company and small factory in town 400 can obtain a license income as consideration for providing the skill of the master 10, the device maker 300 can increase the number of sales of the device (since a set of the skill of the master 10 and the device can be sold), and the manufacturer 200 can produce and sell high-quality products (by the skill of the master 10).

In addition to the first to fourth use cases, the digital "master" platform 100 capable of modeling and accumulating the skill of the master 10 as the "master" model 141 and disseminating the "master" model 141 among, for example, the production sites and the like can be applied variously.

As described above, the digital "master" platform 100 of the present embodiment (manufacturing skill platform system) can disseminate the skill of the master in terms of time and space. Incidentally, the place referred to as the "production site" in the above descriptions does not need to be a place where an actual product is manufactured, but may be a place (dummy factory) where the skill of the master 10 is modeled and accumulated as the "master" model 141. The "master" model 141 thus obtained is disseminated to the factory where actual products are manufactured. In addition, a business style of securing the master 10 having various types of skills in such a dummy factory and obtaining a license income as compensation for providing the skills of the master 10 through the "master" models 141 obtained by modeling the skills of the "master" can also be considered.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. These embodiments and modifications thereof are included in the claims and spirit of the invention, and also included in the inventions described in the claims and their equivalents.

For example, the wording "production site" does not need to indicate a site where "production" is performed, and may simply have the meaning "site". In addition, the "manufacturing skill" is not necessarily limited to "manufacturing", and may have only to have the meaning "skill". Similarly, the "skilled worker" has the meaning "person having a superior skill". This is because the situation that the above-described "master" is present is not limited to what is called the production line of the factory, and may be a place where, for example, the "master" can exert having a prominent skill at various works such as response in the call center and the assortment of baggage in a warehouse.

(Application Example of Manufacturing Skill Platform System)

Next, an application example of the manufacturing skill platform system of the present embodiment will be described. FIG. 4 is a diagram illustrating an application example of the manufacturing skill platform system of the present embodiment. The manufacturing skill platform system of the application example is called an application system in the following descriptions.

The processes to the product shipment of a number of indent products is made to advance in a procedure of "order"→"procurement"→"production"→"quality test (before shipment)". Therefore, in FIG. 14, various modules are arranged along the process procedure.

Figure 14:
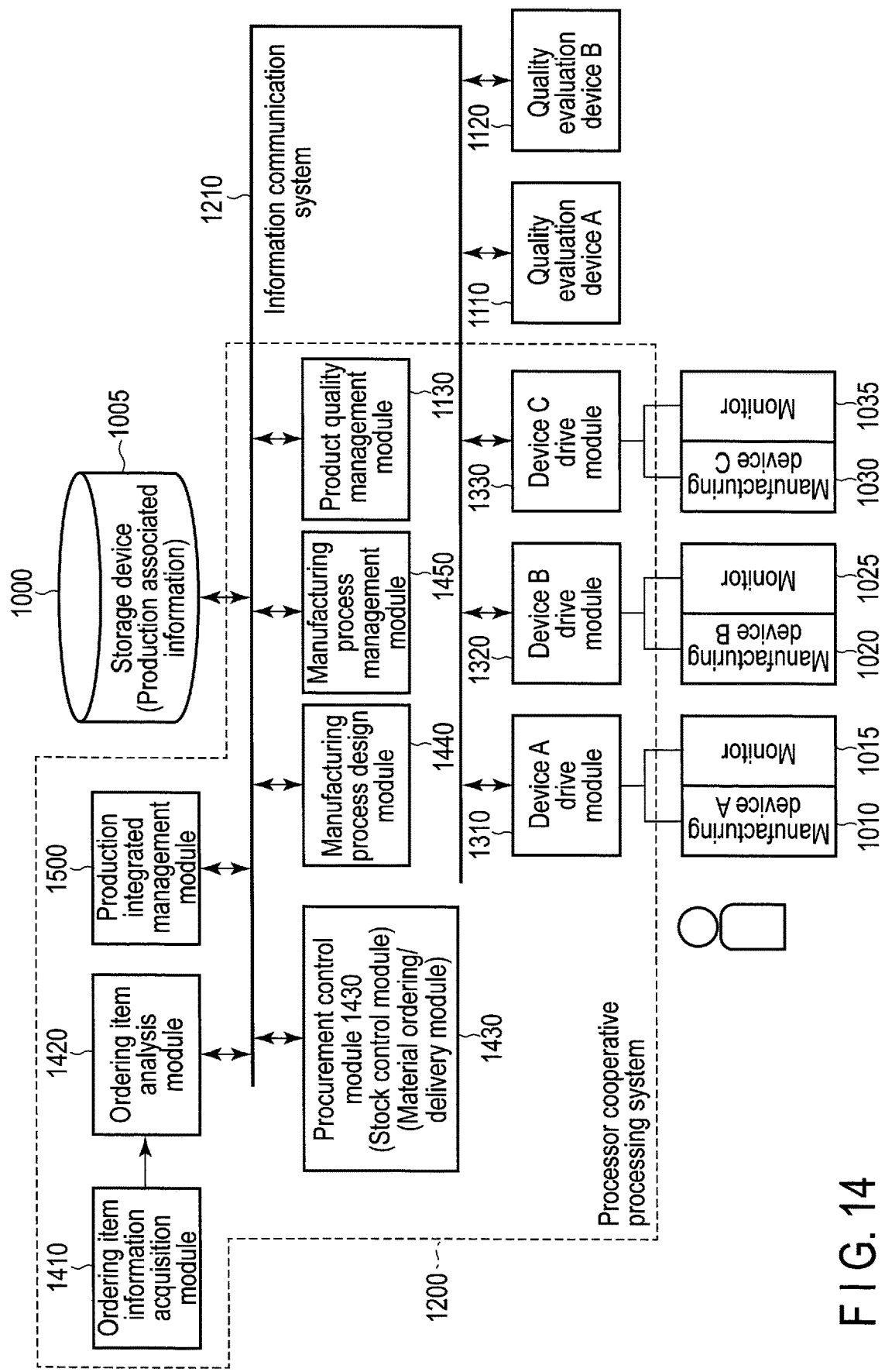
FIG. 14 is a diagram illustrating an application example (application system) of the manufacturing skill platform system of the embodiment.

The hardware configuration in FIG. 14 is composed of, for example, a storage device 1000, various devices, and a processor cooperative processing system 1200 that integrally controls the devices. The information of the above-described "digital master" is stored in the storage device 1000. The information of various digital masters is referred to as generically, production associated information 1005.

The processor cooperative processing system 1200 is composed of one or more processors (arithmetic processing circuits), a recording unit where a program for controlling the process of the processor is stored, and an information communication system 1210. A plurality of processors may be distributed to perform cooperative processing while exchanging information through the information communication system 1210. In particular, program configuration (program architecture) of the inside is clearly illustrated in FIG. 14.

The program to control each processor (arithmetic processing circuit) is composed of various modules distributed for respective functions. Then, the processing at various modules is integrally controlled in a production integrated management module 1500.

As an alignment example of various devices used in production and quality tests, a manufacturing device A 1010, a manufacturing device B 1020, a manufacturing device C 1030, a quality evaluation device A 1110, and a quality evaluation device B 1120 are arranged according to the manufacturing process order to a specific product, in FIG. 14. However, the present application system is not limited to this, and arbitrary manufacturing devices and quality evaluation devices may be arranged in arbitrary combination.

In the present application system, a monitor A 1015, a monitor B 1025, and a monitor C 1035 are installed for the manufacturing devices A 1010, B 1020, and C 1030, respectively, to monitor the detailed condition in the manufacturing course.

In addition, in the application system, though not illustrated, a dedicated processor (arithmetic processing circuit) is built in each of the manufacturing devices A 1010, B 1020, and C 1030, and a device A drive module 1310, a device B drive module 1320, and a device C drive module 1330 are installed as programs for controlling the processors, respectively.

The information of the ordering items necessary for production of the products is input from an ordering item information acquisition module 1410. The ordering item information includes specifications of each ordering item, a request deadline, customer information, and the like. In addition, as the specifications, design drawings, text-bases specifications are included.

The frequency for the ordering item information to be input by the ordering item information acquisition module 1410 is desirably at least one or more times per day on weekdays (actual operation days). To respond to urgent ordering from a customer, however, input acceptance of the ordering items is performed at frequency of once in less than one hour in the present application system.

In addition, in the present application system, the input of arbitrary formats such as Hypertext Preprocessor (PHP) data and Extensible Markup Language (XML) format collecting the input information in the form (<form>) of paper and the Web on which necessary information is described or their input information on the Web can be performed as the input formats of the ordering item information.

The formats to the ordering item information input in different formats are automatically recognized and automatically translated into a uniform format, in the ordering item analysis module 1420. Furthermore, the ordering item analysis module 1420 also analyzes the contents of the ordering items and creates listed data of necessary materials and parts, and partially necessary outsourcing processes for each ordering item. In addition, besides this, it is determined in the ordering item analysis module 1420 whether use of the digital master information (production associated information) 1005 is necessary for the production or not, based on the analysis result of the ordering item. The production integrated management module 1500 is notified of the determination result via the information communication system 1210.

Incidentally, as the example that use of the digital master information 1005 is necessary, required precision and required performance of the product to be manufactured are very high or a requested deadline is very short. Moreover, besides this, the digital master information 1005 may also be used to raise the overall production efficiency including the production of other products and to aim at the profit improvement. Use of the digital master information 1005 is not limited to this, and the information may be used in every useful scene.

In addition, a procurement control module 1430 is notified of the analysis result of the ordering item via the information communication system 1210. In the procurement control module 1430, the "stock control" of materials and parts necessary for production, the "ordering processing" (including ordering of materials and parts, the ordering management for outsourcing necessary for parts of production, and the like), the "delivery management (including the deadline management)", and the like are performed.

More specifically, in the procurement control module 1430, the "stock confirmation" is performed based on the list data of materials and parts necessary for each ordering item output from the ordering item analysis module 1420. Then, materials, parts and outsourcing items that require "new ordering to procure from outsourcing companies" are extracted and automatic ordering is performed. The deadline information and the price information acquired at the automatic ordering are transmitted to the production integrated management module 1500, the manufacturing process design module 1440, and a manufacturing process management module 1450. In the stage that the procurement control module 1430 places an automatic order to the outsourcing companies, production associated information (digital master information) 1005 is utilized as needed.

The information that the procurement control module 1430 can utilize, of the production associated information 1005 stored in the storage device 1000 includes the information on "short deadline products" and "hi-reliability request products", and "products of prices lower than or equal to the usual" related to new ordering products for the outsourcing companies. More specifically, a list of the materials and parts which need to be ordered, company names capable of responding to each outsourcing item, the shortest deadlines, and the lowest prices is stored in the form of database. Furthermore, previous trouble history information of each company is also stored in the storage device 1000.

Moreover, information associated with the procurement know-how is stored in the storage device 1000 as the production associated information 1005. For example, previous response history information of a person in charge of sales of an order receiving company is stored in the form of database. Then, when asking the person in charge of sales for a prior estimate before the ordering, "expectation reliability and delivery expectation date of the item to be delivered" can be estimated by comparing the answer contents (for example, whether the sales person made a reply with conviction or whether the sales person shows behavior with small anxiety, and the like) with the information in the database. The procurement control module 1430 can place an optimum order to the outsourcing company, using the estimation result. Thus, utilization of the production associated information (digital master information) 1005 has an effect that, for example, a risk of "delivery delayed longer than the specified deadline" or "low reliability of the delivered item" can be avoided.

The manufacturing process design module 1440 performs optimum design of the manufacturing process, based on output information from the ordering item analysis module 1420 and the procurement control module 1430. In addition, when the production associated information 1005 is utilized at this stage, the effect of improving the efficiency of the overall manufacturing process including the manufacturing process of other products and implementing substantial reduction in the manufacturing costs can be obtained. Then, the manufacturing process management module 1450 controls various device drive modules 1310, 1320, and 1330, to start the manufacturing process, based on the optimum design result. In manufacturing the product of a normal specification (specifications) level, the device drive modules 1310, 1320, and 1330 individually operate the manufacturing devices 1010, 1020, and 1030, respectively, while using the information obtained from each of the monitors 1015, 1025, and 1035.

In contrast, when the high-specification production that is required to have high production accuracy is necessary, each of the device drive modules 1310, 1320, and 1330 incorporates the production associated information stored in the storage device 1000 through the information communication system 1210.

Then, the production in each of the manufacturing devices 1010, 1020, and 1030 is carried out by utilizing the incorporated production associated information.

Then, pre-shipment inspection of a product completed through the manufacturing device C 1030 in the last step is performed in the quality evaluation device A 1110 and the quality evaluation device B 1120. The quality evaluation results obtained here are transmitted to a product quality management module 1130 via the information communication system 1210. Then, failure/non-failure determination is performed for each product manufactured in the product quality management module 1130. As a result, an end item determined as a non-defective product is shipped to a customer.

In contrast, the production integrated management module 1500 is notified of the result of the defect determination via the information communication system 1210. The production integrated management module 1500 analyzes the information notified and determines the best re-manufacturing process directed to the non-defective product. The manufacturing process design module 1440 is notified of the determination result via the information communication system 1210. Options of the re-manufacturing process at the defect determination includes, for example, (1) a method of starting again from procurement (ordering) of materials and parts, (2) a method of starting again from the initial stage, using existing stock products, (3) a method of starting again from a stage during the production, and the like.

The manufacturing process flow in the application system is illustrated in FIG. 15. When production is started in step C1, preparation for manufacturing a product is first started (step C2). As the specific preparation for manufacturing, for example, warm-up and setting manufacturing parameters for the manufacturing devices A 1010 to C 1030 or preparation of the materials, parts, and the like is performed.

When the ordering item information is input from the ordering item information acquisition module 1410 and the ordering information is confirmed (step C3), the ordering item analysis module 1420 analyzes the ordering item information (step C4). Then, it is determined in step C5 whether the high-specification production needs to be performed or whether manufacturing needs to be performed with reference to the database of the production associated information 1005.

For example, when dimension accuracy described in mechanical part drawing is "±0.2 mm" and squareness accuracy and parallelism accuracy are approximately "±5 minutes", production can be performed in a normal part processing (cutting, and the like) step of general machine cutting devices (manufacturing devices A 1010 to C 1030). However, when the required accuracy is beyond these ranges (for example, the requested dimension accuracy is "±0.05 mm", the squareness accuracy and parallelism accuracy are "±30 seconds, and the like"), special consideration is necessary for part processing. In this case, the high-specification production is required and the digital master information (digital master information) 1005 stored in the storage device 1000 is used.

In this case (step C5: Yes), the database of the production associated information 1005 stored in the storage device 1000 is extracted (step C6), and the information is proposed to the a special processing method is accompanied and proposes to a manufacturing manager or person in charge of manufacturing in terms of the special processing method (step C7). Then, the production (part processing, cutting, and the like) conforming to the proposed contents is started (step C8). In contrast, when the normal production is performed (step C5: No), production is started without referring to the production associated information 1005 (step C8).

The product manufactured with reference to the database of the production associated information 1005 can provide a high-specification product of high production accuracy and high product performance. For example, when a high-accuracy cut part is manufactured with any one of the manufacturing devices A 1010 to C 1030 as a cutting machine, it is necessary to make a feed speed slower at the cutting and make a cutting time longer. When the high-specification production is thus performed, the production time is often longer than usual. Therefore, a problem arises that the overall production time becomes longer and the product cost thereby becomes higher when the database of the production associated information 1005 is utilized in all manufacturing processes.

In contrast, in the present application system, two types of processes:
(1) a process of manufacturing with reference to the database of the production associated information 1005, and
(2) a process of manufacturing under general conditions without using the database of the production associated information 1005,
are performed, and the processes are appropriately changed based on the result of the determination (step C5) of the ordering item analysis module 1420. Thus, the high specification production can be performed and an effect of reducing the overall production costs to a relatively low cost can be generated.

In the manufacturing process of operating the manufacturing devices A 1010, B 1020, and C 1030 (step C9), real-time monitoring of manufacturing condition is performed (step C10). That is, monitors A 10156, B 1025, and C 1035 corresponding to the respective manufacturing devices A 1010, B 1020, and C 1030 collect information of the condition of the manufacturing process in real time. The collected condition information of the manufacturing process is distributed to each of the device drive modules 1310, 1320, and 1330 and the manufacturing process management module 1450 at the same time.

The respective device drive modules 1310, 1320, and 1330 control the manufacturing devices A 1010, B 1020, and C 1030 using the condition information of the manufacturing process obtained from the monitors A 10156, B 1025, and C 1035 while referring to the production associated information (digital master information) 1005, to perform the most suitable part processing.

The manufacturing process management module 1450 estimates the final accuracy and final performance of the manufactured and completed product from the condition information of the manufacturing process sent via the information communication system 1210. Then, when determining that the final accuracy and final performance of the estimated product fall outside the initially predetermined range, a warning notice is sent from the manufacturing process management module 1450 to the device drive modules 1310, 1320, and 1330 and a notification of new production associated information 1005 corresponding to the correction of the processing conditions is made for the modules (step C11).

After the manufacturing process is completed, the quality evaluation devices A 1110 and B 1120 perform evaluation of the product quality (step C12). When predetermined accuracy and performance are obtained (step C13: Yes), the production is assumed to be completed and the flow enters a stage of product shipment (step C14). In contrast, when predetermined accuracy and performance cannot be obtained (step C13: No), the flow returns again to the manufacturing process.

FIG. 16 is an explanatory diagram illustrating the other example of the concept of collecting the data on a plurality of masters' skills and constructing data of superior skills of masters. In this example, material selection data, processing data, condition data, operation data, assembly data, video data, environment data, and the like are collected as the data to evaluate the masters' skills.

For example, material selection data 1601 are data on the material selected when an article is to be manufactured. When selecting the material, the master selects the material by referring to the material providing maker, the components of the material, the combination of the components, the year and date of production of the components, and the like.

Processing data 1602 are data used when the master performs processing works, and data such as a cutting position of the material, an amount of shaving of the material, timing of shaving the material, an amount of bending of the material, and timing of bending of the material. For the data collection, what is called sensors such as monitoring cameras, measuring devices, and electron microscopes are used.

Condition data 1603 are data obtained by measuring change with a time axis when, for example, the master changes parts or materials to the other shape. For this reason, in the condition data, heating data include temperature change properties, the period from the work start to the time when the temperature changes to a predetermined temperature. In addition, pressurization data include the pressurization variation properties, the period from the work start to the predetermined variation (displacement). Bending amount data also include the period from the time to start the part processing work to the time when a predetermined bending amount can be obtained. Furthermore, bending timing data include the period from the time to start the part processing work to the time when the master starts the bending work.

Operation data 1604 include, for example, the motion data (change data and characteristic data thereof) of a handle of the processing device.

Assembly data 1605 include data such as the period information from the time to start the assembling work to the time to start coupling to couple the first and second parts, and the angle of mounting a mounting part to a non-mounting part at the coupling.

Video data 1606 include, for example, data obtained by monitoring the master's movement, such as movement of the arms thereof, movement of the shoulders thereof, and the direction of sight.

Environmental data 1607 includes data on the room temperature, humidity, a vibration at the time when the master performs the work and, furthermore, the temperature and humidity of outer air, region information (including the domestic and foreign countries' information), seasons, and the year and date.

When the master's work starts (1611) and the work ends (1612), the acquired data of each item are evaluated. Various types of the master evaluation method have been developed. For example, the performance test and inspection of completed parts and the device are performed. In the performance test and inspection, it is determined whether the completed parts and devices conform to preset part standards and device standards.

When a plurality of master perform the same work, it is determined which of the parts and devices of those produced by the respective masters conform to ideal standards. It is assumed that master A and master B have produced the same parts A and B and each of the parts conforms to the part standards. In such case, it is determined which of the parts A1 and B1 conforms to the ideal standards. Then, when it is determined that the part A1 produced by the master A is superior, data of master A are adopted as skill data of the master.

However, the part B1 produced by the master B is often determined to be superior to the part A1 depending on the environmental data 1607. In this case, the skill of either the master A or the master B may be used on the environment.

For this reason, in the present application system, a plurality of masters are classified depending on the environment, and the masters evaluated as superior masters are also classified in each environment. In other words, the skills of the respective master A, master B, and master C are evaluated by the inspection and test, and each of them is often determined to have the best evaluation (evaluation A) depending on the environment.

Figure 17:
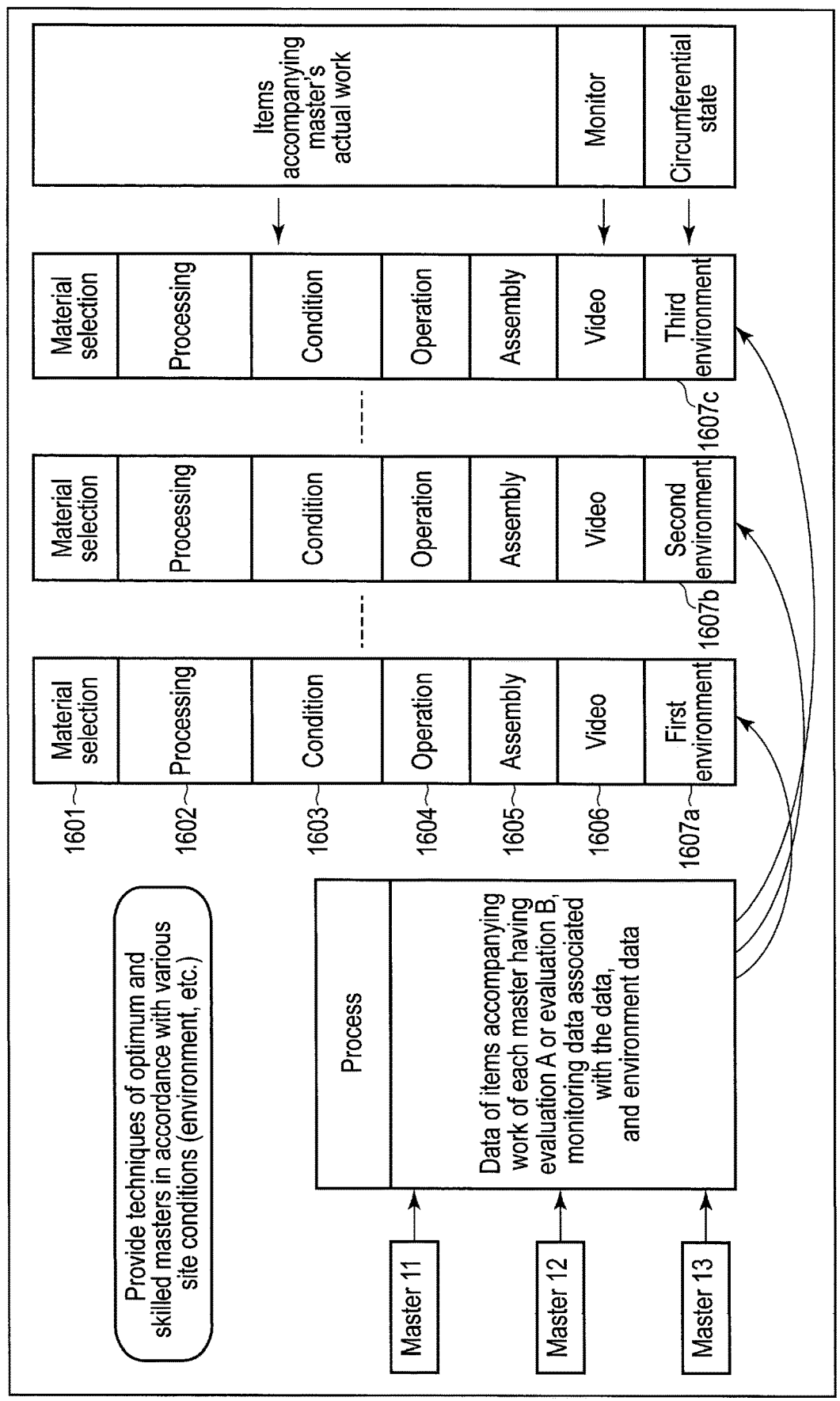
FIG. 17 is a diagram illustrating a summary of an example of using the plurality of masters' skills depending on environment in the application system.

FIG. 17 schematically illustrates an example of using the skills of the master 11, master 12, and master 13 depending on environment in the present application system. In this example, for example, as regards processing data 1602, the parts produced by the master 11, master 12, and master 13 are assumed to meet determined standards. However, it is assumed that the part produced by the master 11 is superior in the first environment, that the part produced by the master 12 is superior in the second environment, and that the part produced by the master 13 is superior in the second environment. In such a case, in the present example, the best skill of the master can be adopted in each environment on using the skill of the master with reference to processing.

The method of using the skill of the master on the processing has been described, but the data of the master having the high-level skill can also be used similarly as regards the other items, i.e., material selection, condition, control, assembly, and video.

As a result, the present application system is also desirable when factories, work places, and the like have their areas changed or are moved abroad.

Incidentally, several examples of the method of utilizing the present application system has been indicated in the above descriptions, but the present application system can be used in various forms. For example, the performance of the product to be completed as a whole can be simulated by combining the data of the respective work items (data of material, processing, condition, control, assembling, and environment). Then, a virtual product comprising the best, for example, characteristics (intensity, rate, tolerance, and the like) can be assumed in advance before production. In addition, for this reason, for example, skilled workers (masters) for combining the data of the respective work items (data of material, processing, condition, control, assembling, and environment) can also be educated.

(Example of Generating the Information of the Digital Master)

Subsequently, an example of generating the digital master information (production associated information) 1005 in the above-described application system will be described.

Figure 18:
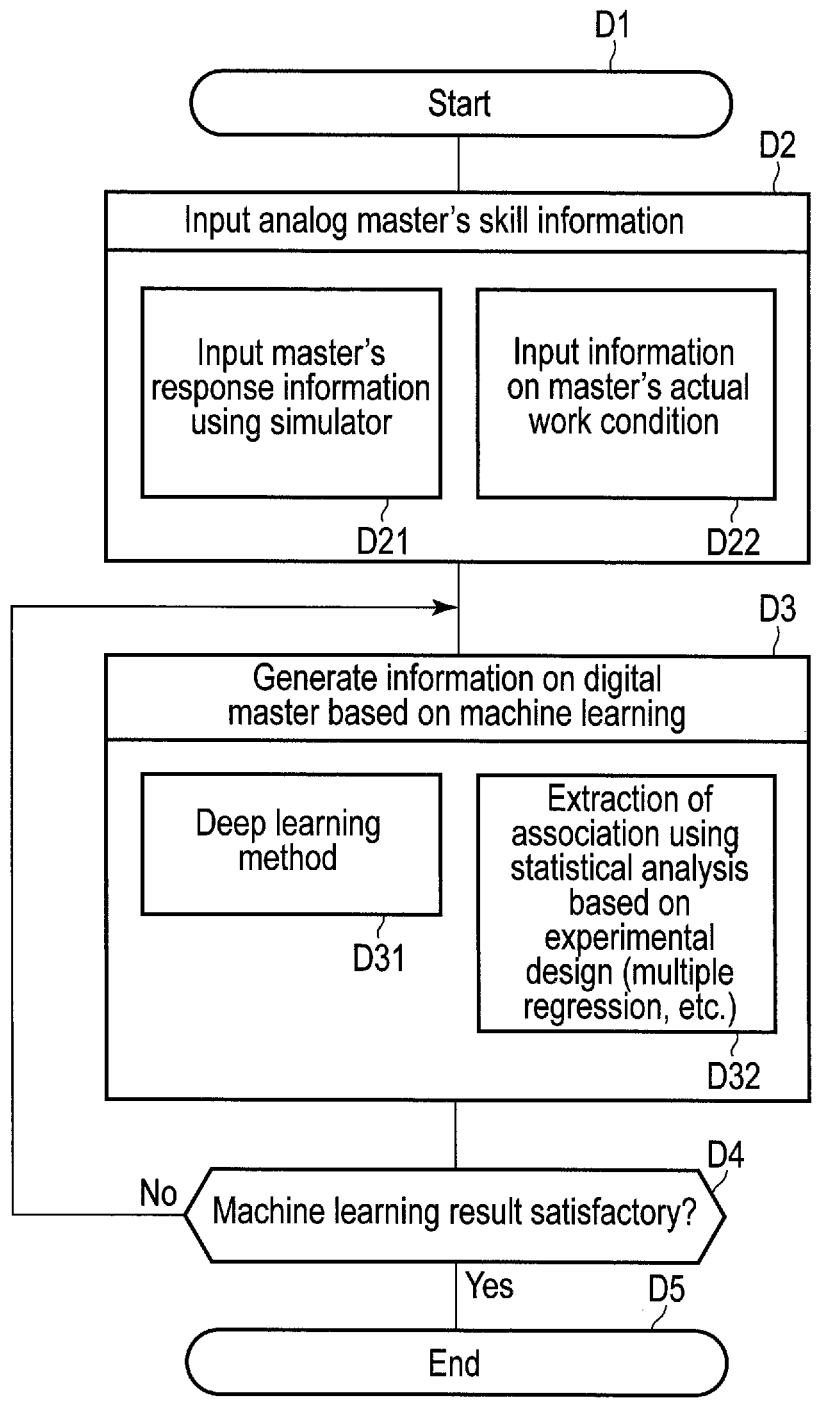
FIG. 18 is a diagram illustrating a generation example of the digital master information (manufacture associated information) in the application system.

A concept of the method of generating the digital master information (production associated information) 1005 stored in the storage device 1000 of the application system in FIG. 14 is illustrated in FIG. 18. Basically, the method is composed of a step D2 of inputting analog "master's skill" information and a subsequent step D3 of generating digital master information based on machine learning.

As the method of inputting the analogue "master's skill" information in step D2, any one of a method (step D21) of using a simulator and a method (step D22) of directly inputting an observation result of the master's actual work condition may be used.

As the method (step D22) of directly inputting an observation result of the master's actual work, for example, the master's movement is captured while recording the master's actual work environment that changes every moment with a plurality of cameras. At least one camera monitors the master's line of sight (what is the master seeing?) in real time while capturing the movement of the master's pupils.

The method analyzes a recording content after recording (or concurrently with recording), and extracts correlation between the "master's actual work environment change" and the "master's line of sight (object at which the master looks)"/"master's behavior content". In other words, the method extracts the correlation by generation of the digital master information based on machine learning (step D3).

As the method of generating the digital master information based on machine learning (step D3), for example, a deep learning technique (step D31) and an association extracting method using the statistical analysis (for example, multiple regression analysis and the like) based on experimental design (step D32) are used together. However, the method is not limited to this and, for example, any one of them may be used or the other machine learning technique may be further used.

Figure 19:
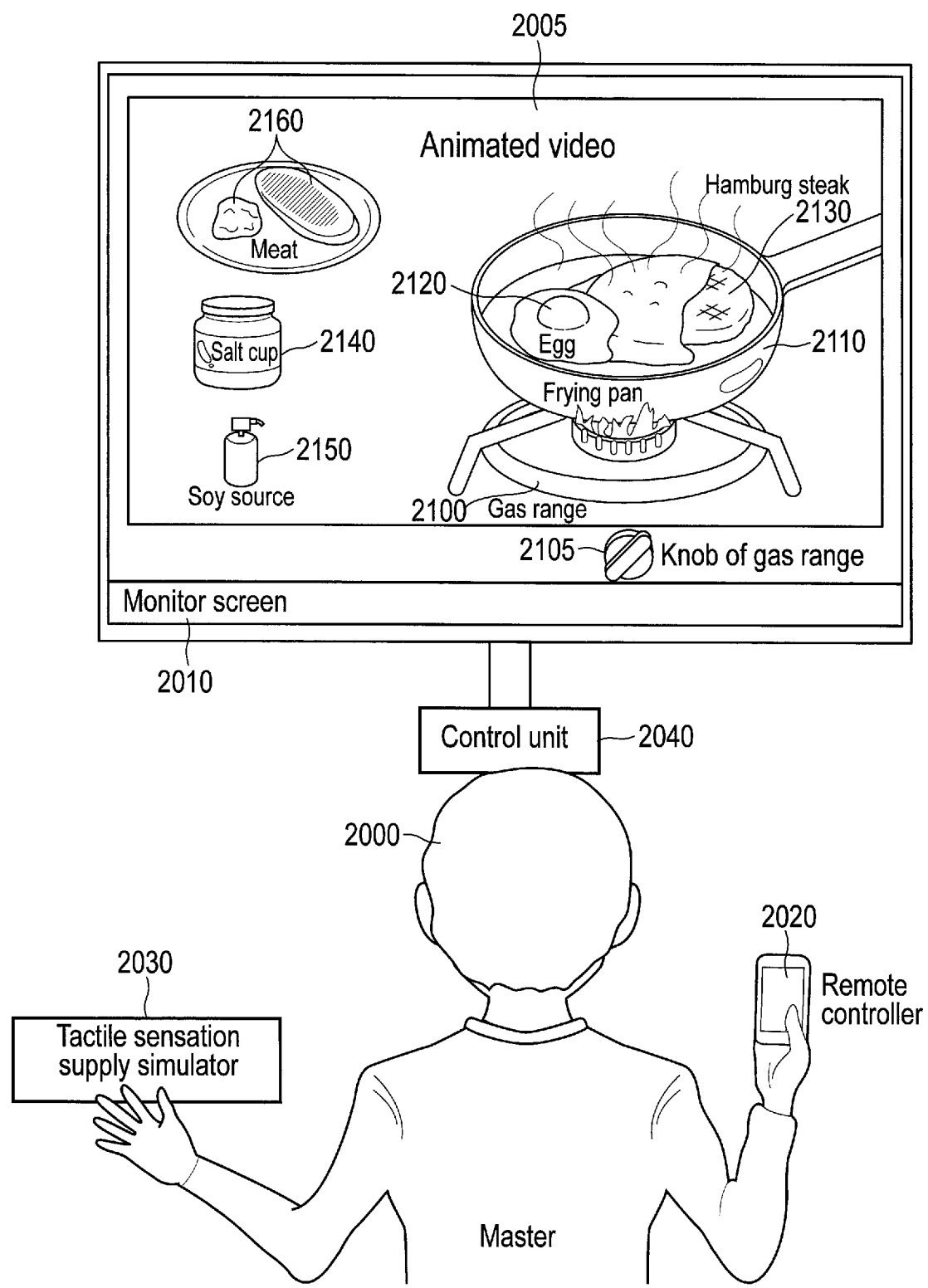
FIG. 19 is an explanatory diagram illustrating an example of a method of inputting the information on the master's skill using a simulator in the application system.

An example of the method using a simulator (step D21) is illustrated in FIG. 19. The simulator that inputs information on the analogue "master's skill" is composed of a monitor screen 2010 for displaying an animation movie 2005 to a master 2000, a remote controller 2020 for helping the master 2000 operate the monitor screen 2010, a tactile sensation supply simulator 2030 for simultaneously giving tactile sensation to a finger (or a palm) of the master 2000, and a control unit 2040 for controlling actions thereof.

Since a cooking scene (as for the dishes a kind of the production) can easily be understood as a scene where the "master's skill" is exerted, an example of an animated video 2005 is illustrated in FIG. 19. It is assumed that, for example, a gas range 2100 heats a frying pan 2110, and an egg 2120 being cooked and a hamburg steak 2130 being cooked are in the frying pan 2110. A master 2000 puts salt 2140 and soy sauce 2150 for seasoning at appropriate timing while looking at the turning point of the color of the hamburg steak 2130 and operates a knob 2105 of the gas range to regulate fire. At this time, the simulator approximately changes the color of the hamburg steak 2130 in the animated video 2005 and monitors the movement of the master 2000.

The skill of master 2000 is not used only when cooking advances smoothly, but "the master's skill" is also used for the action of the master 2000 at occurrence of a trouble (when, for example, a fire occurs or cooking is likely to fail). Therefore, the simulator may cause a trouble to occur on the animated video 2005 without a preliminary notice to the master 2000 and record the movement of the master 2000.

Figure 20:
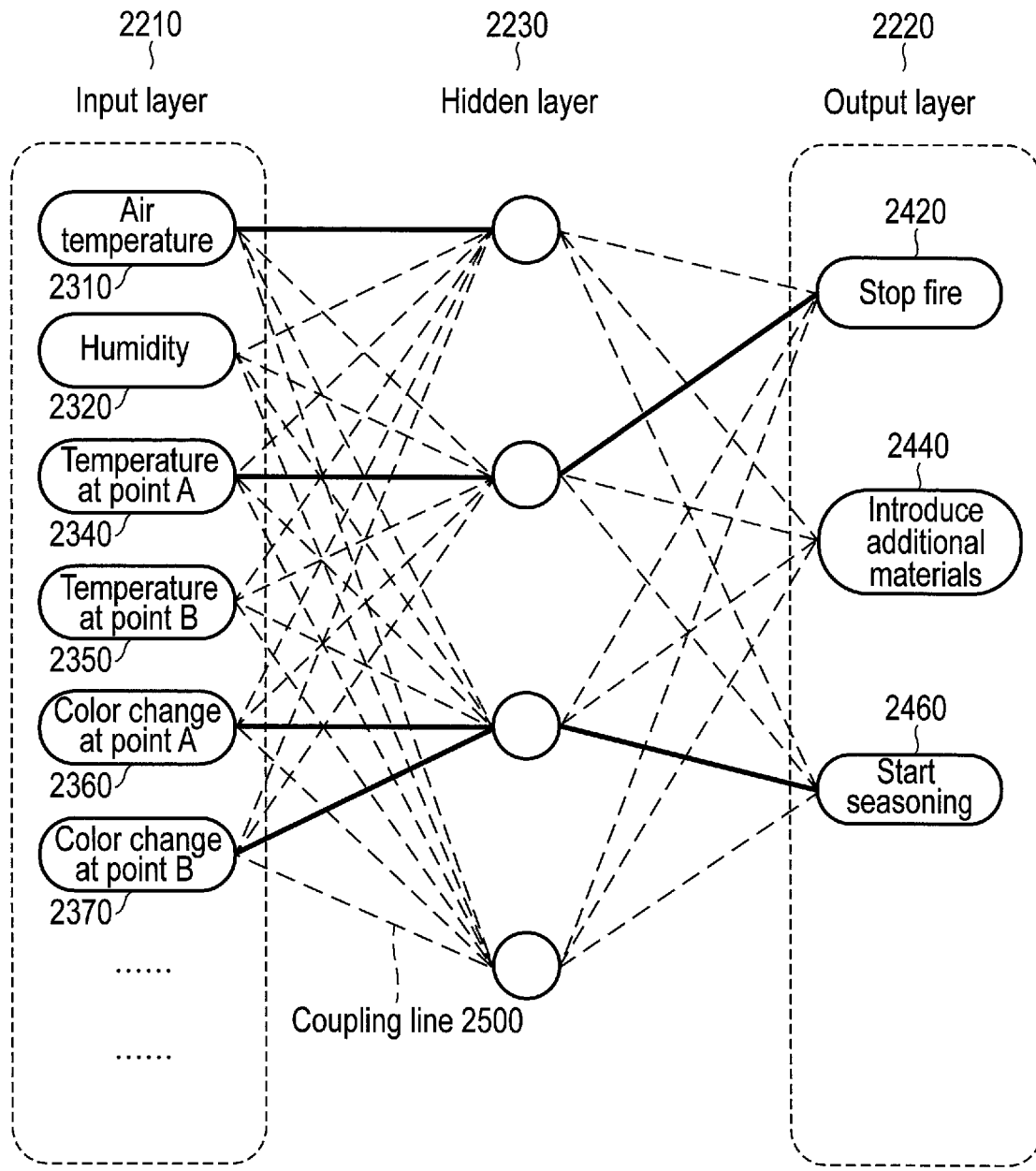
FIG. 20 is a drawing illustrating an example of creating information on "digital master" from analog "master's skill" information in the application system.

An example of generating the "digital master" information from the analogue "master's skill" using the deep learning technique (step D31) in FIG. 18 is illustrated in FIG. 20. According to the deep learning technique (FIG. 18: step D31), a hidden layer 2230 is defined between an input layer 2210 and an output layer 2220.

As a plurality of input contents in the input layer 2210, for example, temperature 2310, humidity 2320, temperatures 2340 and 2350 and color variations 2360 and 2370 at respective points may be set. In addition, as a plurality of output contents in the output layer 2220, for example, an operation 2420 of stopping fire, an additional material introduction operation 2440, a seasoning start operation 2460 may be set. Then, nodes (relay points) arranged in the hidden layer 2230 connect each of input contents 2310 to 2370 in the input layer 2210 and each of the output contents 2420 to 2460 in the output layer 2220. In addition, coupling lines (information transmission paths) 2500 coupling the points are weighted depending on the transmission frequency.

First, weight of each coupling line 2500 is set temporarily. Then, the output contents 2420 to 2460 according to the setting screen change of the animated video 2005 are predicted based on the temporary set values thereof. Feedback is performed using error back propagation, from differential values between the predicted output contents 2420 to 2460 and the execution contents of the actual master 2000 to the weight quantity of each coupling line (information transmission path) 2500. Relearning of the deep learning is performed by repeating this.

The weight quantity of each of the coupling lines 2500 converges by repeating the relearning. In FIG. 19, a coupling line (information transmission path) 2500 having a high information transmission frequency is represented by a thick line. Relations between the input contents 2310 to 2370 in the input layer 2210 and the output contents 2420 to 2460 in the output layer 2220 having high correlation, can be extracted by tracing the coupling line (information transmission path) 2500 having converged to some extent, which is represented by a thick line. The extraction result (correlation information obtained by the trace of the thick line) may be stored in the storage device 1000 as the "digital master" information (production associated information) 1005. In addition, the storage is not limited to this, and all information illustrated in FIG. 20 may be recorded in the storage information 1000 as the learning result.

The hidden layer 2230 does not exist in the relation extraction learning (FIG. 18: step D32) using the statistical analysis (multiple regression analysis and the like) based on the experimental design as compared with the deep learning technique (FIG. 18: step D31). Statistical analysis (such as multiple regression analysis) is performed using the recording result with the simulator illustrated in FIG. 19, and a coefficient of correlation between direct input contents 2310 to 2370 and the power contents 2420 to 2460 is calculated. Furthermore, a correlative part may be extracted in the reference value determination of "significance level of 5%," as used in the general statistical analysis technique.

Figure 21:
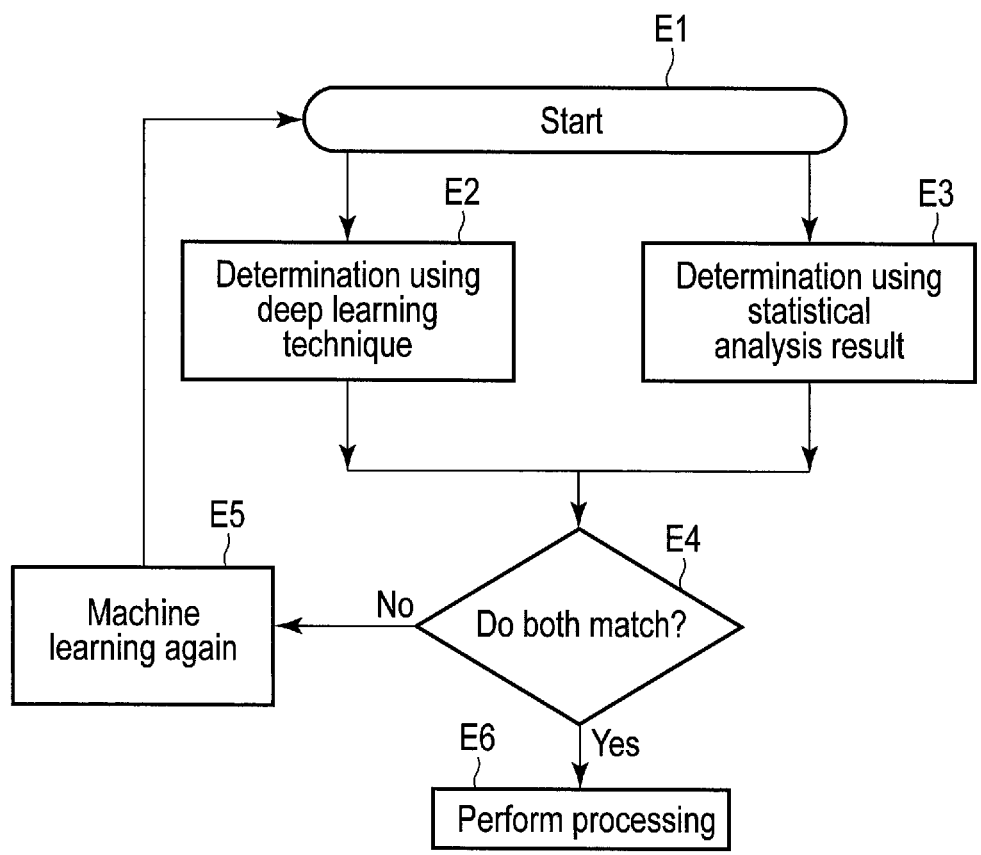
FIG. 21 is a drawing illustrating an example of a processing method to be performed in each module of the application system.

The procurement control module 1430, the manufacturing process design module 1440, and the manufacturing process management module 1450 illustrated in FIG. 14 use the digital master information (production associated information) 1005 obtained from the machine learning result as described above. An example of the processing method to be performed in each module is illustrated in FIG. 21.

When use of the production associated information is started in each module (step E1), determination using the deep learning technique (step E2) and determination using the statistical analysis result (step E3) are performed concurrently. Then, in step E4, the degree of matching of the determination results is verified. When both of them match (step E4: Yes), the determination result is considered correct and a process based on the determination result is performed (step E5).

In contrast, when the results of both of them do not match (step E4: No), machine learning is considered insufficient, and machine learning is performed again (step E6). After that, the flow returns to the start of use of the production associated information in step E1, and the determinations are repeated.

This example has effects of improving the determination accuracy based on the machine learning results and making machine learning of higher accuracy, by using a plurality of different machine learning methods.

Thus, the present manufacturing skill platform system is available for various applications. In addition, various methods can also be applied to the digitization of the master's skill.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A skill platform system comprising:
a processor; and
a storage device in which a program is stored, the program controlling the processor to function as:
a data acquisition unit configured to acquire data on work of workers at a first site in real space to construct a first digital twin that reproduces in cyberspace the work of the workers in real space, wherein the data includes data on input to the workers and data on output from the workers, the data on output being data indicative of lines of sight of the workers and/or behavior content of the workers;
a data extraction unit configured to extract data on work of skilled workers from the data of the first digital twin to construct a second digital twin that reproduces the work of the skilled workers in the cyberspace;
a model creation unit configured to perform, using a computer model, modeling of a skill of the skilled workers by extracting, from the data on input and the data on output in the second digital twin, relations between the data on input and the data on output having high correlation, and by creating information indicative of the extracted relations as the computer model; and
a skill provision unit configured to provide the skill of the skilled workers to a second site in the real space by using the computer model created by the model creation unit.

2. The skill platform system of claim 1, wherein the program further controls the processor to function as
a customization unit configured to customize the computer model allocated to the second site, based on evaluation data indicative of evaluation at the second site for the skill of the skilled worker provided by the skill provision unit.

3. The skill platform system of claim 1, wherein the skill provision unit is configured to estimate an action to be taken at the second site, using the computer model, from input information on work at the second site.

4. The skill platform system of claim 1, wherein the model creation unit is configured to create as the computer model a neural network by using the data on input and the data on output as learning data.

5. The skill platform system of claim 4, wherein the neural network comprises at least one of a fully connected neural network, a convolutional type neural network, a recurrent type neural network, and a self-encoding neural network.

6. The skill platform system of claim 1, wherein the skill provision unit is capable of providing the skill of the skilled worker in a field unit or a process unit.

7. The skill platform system of claim 1, wherein the data acquired by the data acquisition unit comprises information on an event recognized by the skilled worker with five senses, a captured image of the skilled worker, information on an action of the skilled worker, information on a condition of a device that the skilled worker handles, or information on an achievement of the skilled worker.

8. The skill platform system of claim 1, wherein:
a first computer model corresponding to a first field or a first process is created with data on work of a first skilled worker engaged in work of the first field or the first process, and a second computer model corresponding to a second field or a second process is created with data on work of a second skilled worker engaged in work of the second field or the second process.

9. The skill platform system of claim 8, wherein:
the data acquisition unit is configured to acquire data on a plurality of sites including the first site; and
the first skilled worker and the second skilled worker are workers of different sites.

10. The skill platform system of claim 1, wherein the data acquisition unit is configured to acquire the data by a simulator.

11. The skill platform system of claim 10, wherein the simulator includes a tactile sensation supply simulator for giving tactile sensation to at least one of a finger and a palm of the skilled worker.

12. The skill platform system of claim 10, wherein the data acquisition unit is configured to cause a trouble on the work to occur in the simulator, and to acquire data on an action of the skilled worker coping with the trouble.

13. The skill platform system of claim 1, wherein the data indicative of the lines of sight of the workers and/or the behavior content of the workers comprises data indicative of the lines of sight of the workers captured by a camera and tracking pupils of the workers in real time.

14. The skill platform system of claim 1, wherein
the model creation unit includes one or more work-specific model creation units provided for respective works of plural fields and processes and is configured to
create the computer model for each work of the plural fields and processes, and
adaptively increase or decrease the one or more work-specific model creation units.

15. A skill dissemination method executed by a computer, the method comprising:
acquiring data on work of workers at a first site in real space to construct a first digital twin that reproduces the work of the workers in cyberspace, wherein the data includes data on input to the workers and data on output from the workers, and the data on output being data indicative of lines of sight of the workers and/or behavior content of the workers;
extracting data on work of skilled workers from the data of the first digital twin to construct a second digital twin that reproduces the work of the skilled workers in the cyberspace;
modeling, using a computer model, a skill of the skilled worker by extracting, from the data on input and the data on output in the second digital twin, relations between the data on input and the data on output having high correlation, and by creating information indicative of the extracted relations as the computer model; and
providing the skill of the skilled worker to a second site in the real space by using the computer model created by the modeling.

16. The method of claim 15, wherein the modeling comprises creating as the computer model a neural network by deep learning using the data on input and the data on output as learning data.

17. The skill dissemination method of claim 15, wherein the modeling includes
creating the computer model for each work of plural fields and processing, by one or more work-specific model creation units provided for respective works of the plural fields and processes, and
adaptively increasing or decreasing the one or more work-specific model creation units.

* * * * *